(12) United States Patent
Van Den Ouweland et al.

(10) Patent No.: US 6,287,620 B1
(45) Date of Patent: *Sep. 11, 2001

(54) FLAVOR ENHANCING METHODS

(75) Inventors: Godefridus Van Den Ouweland, Troinex; François Benzi, Geneva; Nicole Van Beem, Dully, all of (CH); Claude Vanrietvelde, St-Julien-en-Genevois (FR)

(73) Assignee: Firmenich SA, Geneva (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/649,706

(22) PCT Filed: Oct. 5, 1995

(86) PCT No.: PCT/IB95/00837

§ 371 Date: May 30, 1996

§ 102(e) Date: May 30, 1996

(87) PCT Pub. No.: WO96/10927

PCT Pub. Date: Apr. 18, 1996

(30) Foreign Application Priority Data

Oct. 7, 1994 (CH) .................................... 3019/94

(51) Int. Cl.$^7$ .............................. A23L 1/22; A23L 1/221; A23L 2/56
(52) U.S. Cl. ..................... 426/534; 426/65; 426/533; 426/650; 426/656; 426/804
(58) Field of Search .............. 426/533, 65, 534, 426/650, 656, 804

(56) References Cited

U.S. PATENT DOCUMENTS

| | | | |
|---|---|---|---|
| 3,853,996 | * 12/1974 | Begemann et al. | 426/65 |
| 3,865,952 | * 2/1975 | Ney et al. | 426/65 |
| 4,020,190 | * 4/1977 | Ney et al. | 426/534 |
| 4,228,099 | 10/1980 | Walser | 260/501.11 |
| 4,320,146 | 3/1982 | Walser | 424/319 |
| 4,957,938 | * 9/1990 | Anderson et al. | 514/412 |

FOREIGN PATENT DOCUMENTS 406 811 * 1/1991 (EP) .

OTHER PUBLICATIONS

Arctander (Ref. AJ) "Perfume and Flavor Chemicals", S. Arctander, Montclair, N.J. (USA) vol. II, 1969.*
Harper (Ref. AL) Journal of Dairy Science vol. 42: 207–21311, 1959.*
Furia et al. (Ref. AN) Fenaroli's Handbook of Flavor Ingredients, 2nd edit., vol. 2, 1992.*
S. Arctander, "Perfume and Flavor Chemicals", S. Arctander, Montclair, N.J. (U.S.A.), vol. II (1969).
J. Kamsteeg et al., "E–eetbaar?", H.J.W. Becht (Amsterdam) 1986 pp. 174–175.
W. Harper, "Our Industry Today", *Journal of Dairy Science*, vol. 42 (1959) pp. 207–213.
K.H. Ney et al., "Flavor of Edelpilzkaese, a German blue mold cheese", *Chemical Abstracts*, vol. 78 (1973) p. 374.
T.E. Furia et al., *Fenaroli's Handbook of Flavor Ingredients*, Second Edition, vol. 2.
Aldrich, "2–Oxobutyric acid", *Aldrich Flavors & Frangrances*, (1990) p. 41.

* cited by examiner

*Primary Examiner*—Michael P. Woodward
*Assistant Examiner*—Mary K. Zeman

(57) ABSTRACT

α-keto acids and certain precursors and derivatives thereof, particularly those selected from the group which consists of glyoxylic acid, 2-oxo-propanoic acid, 2-oxo-butanoic acid, 3-methyl-2-oxo butanoic acid, 3-methyl-2-oxo pentanoic acid, 4-methyl-2-oxo pentanoic acid, 3-hydroxy-2-oxo-propanoic acid, oxalacetic acid, 2-oxo-glutaric acid, 2-oxo-3-phenyl-propanoic acid, 3-(4-hydroxy-phenyl)-2-oxo-propanoic acid, 2-oxo-1H-indole-3-propanoic acid, 2-oxo-1H-imidazole-4-propanoic acid, 4-methylthio-2-oxo-butanoic acid, 3-mercapto-2-oxo-propanoic acid, 3-hydroxy-2-oxo-butanoic acid, 6-amino-2-oxo-hexanoic acid and 5-guanido-2-oxo-pentanoic acid, and precursors and derivatives thereof that are capable of being formed from or releasing said acids in the use medium, are useful as flavouring ingredients. Such ingredients are useful for preparing flavouring compositions and a wide variety of flavoured foodstuffs to which they impart greater creaminess and bulkiness so that they have heightened effect in the mouth and generally an enhanced mouthfeel. They are also useful for enhancing the sweetness of foods sweetened with natural or artificial sweeteners, and giving it a more natural character.

11 Claims, No Drawings

FLAVOR ENHANCING METHODS

TECHNICAL FIELD

The present invention relates to the flavoring industry and more particularly to the use of α-keto-acids as flavoring ingredients for the preparation of flavoring compositions and/or flavored food or pharmaceutical products.

Tha α-keto-acids are a group of compounds which obey the general formula

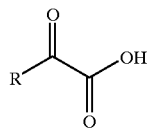

(I)

wherein symbol R can represent hydrogen or a large variety of alkyl radicals, saturated or unsaturated, linear or branched, optionally substituted by hydroxy, amino, phenyl, hydroxy-phenyl, carboxy, mercapto, methylthio, guanidino and other groups. More than a hundred of such compounds are presently known and the invention concerns more particularly the use as a flavoring ingredient of a certain number of these acids mentioned below, which are edible.

PRIOR ART

A good number of these compounds are known as components of natural products, wherein they are formed by fermentation of amino acids resulting from the enzymatic transformation of proteins. Thus, several of these acids have been found, among others, in cocoa, in several types of cheese, or yet in beer.

It is also known that the α-keto-acids can play a decisive role in the metabolism of living beings when acting as precursors of essential and semi-essential amino acids, and this renders them useful in the pharmaceutical industry. In this context, they have been known to be used, for example, as active principles in medications intended for the treatment of kidney or liver diseases. However, their use to this effect presents some difficulties related to their unpleasant odor and taste (see for example, FR 2 419 723 and EP 406 811), and this has prompted a number of researchers to propose particular carrier systems, e.g. cyclodextrine clathrates (EP 406 811), which make it possible to palliate such problems.

In view of the preceding comments, it may not be surprising to observe that, in spite of the many prior art reports related to the natural occurrence of certain of these keto-acids and to their use for therapeutical applications, to our knowledge, it has never been suggested to apply them as active flavoring ingredients, to improve the taste and aroma of edible products, by adding them to these products in essentially pure form, i.e. devoid of the natural substances which may accompany them in a natural product.

We have now surprisingly discovered that the above-mentioned compounds are very advantageous flavoring ingredients, and that the scope of their use to this effect can be extremely general. We have thus established that, upon addition of one or several of these compounds to flavoring compositions o r concentrated flavors of a large variety, one could improve in an unexpected manner the taste of said compositions and concentrates, namely the "mouthfeel" of these products, without observing any harmful organoleptic effect, unlike what could have been expected in view of the prior art.

DESCRIPTION OF THE INVENTION

Thus, an object of the present invention is an artificial flavoring composition containing as an active ingredient one or several compounds selected from the group consisting of the α-keto-acids in essentially pure form, as well as their edible derivatives and precursors susceptible of being formed from said acids, respectively liberate said acids, in the utilization medium.

By an α-keto-acid in essentially pure form it is understood here an α-keto-acid which is not accompanied by the substances with which it may occur in a natural origin product, nor in the same proportions.

According to a preferred embodiment of the flavoring composition of the invention, the active ingredient is formed of one or several compounds selected in the group consisting of glyoxylic, 2-oxo-propanoic, 2-oxo-butanoic, 3-methyl-2-oxo-butanoic, 3-methyl-2-oxo-pentanoic, 4-methyl-2-oxo-pentanoic, 3-hydroxy-2-oxo-propanoic, oxalacetic, 2-oxo-glutaric, 2-oxo-3-phenyl-propanoic, 3-(4-hydroxyphenyl)-2-oxo-propanoic, 2-oxo-1H-indole-3-propanoic, 2-oxo-1H-imidazole-4-propanoic, 4-methylthio-2-oxo-butanoic, 3-mercapto-2-oxo-propanoic, 3-hydroxy-2-oxo-butanoic, 6-amino-2-oxo-hexanoic and 5-guanidino-2-oxo-pentanoic acids, and by the edible derivatives and precursors of these acids susceptible of being or of liberating the latter in the utilization medium.

By "utilization medium" it is meant here, either the medium of the actual flavoring composition, which will also typically contain one or more current flavoring ingredients of natural or synthetic origin, optionally in admixture with the usual solvents and adjuvants, or the medium of the food or pharmaceutical product into which said flavoring composition may be incorporated. It is apparent therefore, that such a medium will possess physical and chemical characteristics, and namely a pH, which are a function of the nature of the varied components present in the flavoring composition or in the above-mentioned end-products and which can condition the chemical form in which the α-keto-acid occurs in said medium and produces its organoleptic effect. One has in mind in particular the possible formation of hydrates in aqueous solution, or yet the derivatives which can result from keto-enol type tautomeric equilibria. The group of compounds from which the active ingredient of the flavoring composition according to the invention can be selected thus includes these potential derivatives which can be formed from said α-keto-acids under the conditions of their utilization.

Likewise, as the edible derivatives or precursors of the α-keto-acids in the context of the invention, one can cite in particular the edible salts of these acids, for example their salts of alkaline metals such as sodium, lithium, magnesium, potassium or calcium, or yet their $C_1$ to $C_4$ alkyl esters.

By $C_1$ to $C_4$ alkyl esters it is referred here the ester derivatives of the above-mentioned acids wherein the ester function contains a saturated or unsaturated, linear or branched alkyl group, having 1 to 4 carbon atoms. Among others, these include the methyl and ethyl esters.

Other edible precursors of the α-keto-acids include the corresponding amino acids and namely the essential and semi-essential amino acids and their salts of alkaline metal. When referring here to the amino acids, one is referring more particularly to the enantiomers of these acids which possess an L configuration, which have a natural occurrence.

The addition according to the invention of the α-keto-acids and/or their above-mentioned derivatives and precursors, as active ingredients, to the flavoring compositions and concentrates typically produces an improvement or enhancement of the impact and of the rich, creamy and full feeling of the composition in the mouth, i.e. of the gustative impressions connected to the texture, volume and fullness as perceived upon tasting these products and which are generally referred to under the designation of the "mouthfeel" of the product. Moreover, these effects may be accompanied of other imparted aromatic attributes, namely those associated with the volatile notes responsible for the characteristic odor and taste of a certain food product, for the flavoring of which the composition or concentrated is intended.

Now, this is a totally unexpected effect in view of the prior art knowledge, particularly as regards the literature reports related to the natural occurrence of these compounds in cheeses. These reports do in fact suggest that the said compounds may play a role in the taste of the cheese, which role may be more or less important depending on the nature of the latter, without however qualifying this role and never associating it to the cheeses' characteristics which relate to the texture and more or less creamy and buttery nature thereof, e. g. their mouthfeel.

Furthermore, as is apparent from the examples presented further on, in a number of applications, upon the use of certain compounds among those cited, there was observed a radical modification of the properties of the base composition, with a remarkable improvement not only of the mouthfeel of this composition, its volume and fullness, but also, or rather, in certain aromatic notes having a choice contribution for the composition's organoleptic value.

However, the organoleptic effect of these $\alpha$-keto-acids and their above-cited derivatives and precursors turns out to be even more varied. We have in fact ascertained that they could also reinforce the taste sensation of sweetness imparted by natural or artificial sweeteners. Said compounds are consequently particularly useful for flavoring foodstuffs and beverages having a low sugar content, which are typically sweetened with artificial substances such as Aspartame® (Nutrasweet Co.), Sodium cyclamate (sodium cyclohexylsulfamate), Sucralose® (Tate & Lyle), saccharine, Acesulfam® K (Hoechst Ag) or others.

Amongst the compounds which use is the object of the invention, one can cite yet, as preferred embodiments, 2-oxo-butanoic, 3-methyl-2-oxo-butanoic, 3-hydroxy-2-oxo-propanoic, 2-oxo-3-phenyl-propanoic, 3-methyl-2-oxo-pentanoic, 4-methyl-2-oxo-pentanoic, 4-methylthio-2-oxo-butanoic, 3-mercapto-2-oxo-propanoic or 2-oxo-1H-indole-3-propanoic acids, as well as their derivatives and precursors which can be formed or liberate these acids in the utilization medium.

Following a preferred embodiment of the invention, the $\alpha$-keto-acids mentioned above are used in admixture with at least one amino acid selected from the group consisting of 2-amino-butanoic acid, glycine, $\alpha$-alanine, norvaline, valine, aspartic acid, norleucine, leucine, isoleucine, serine, threonine, glutamic acid, phenylalanine, tyrosine, cysteine, methionine, glutamine, theanine (N-ethylglutamine), asparagine, cystine, citrulline, $\gamma$-methylene-glutamic acid, lysine, tryptophane, histidine, arginine and their salts of alkaline metals, for the preparation of the flavoring compositions of the invention.

We have thus observed a synergic effect when the $\alpha$-keto-acid was used in admixture namely with the corresponding $\alpha$-amino-acid, wherein the latter can enhance the organoleptic effect of the $\alpha$-keto-acid.

Preferably, these flavoring compositions contain the above-mentioned amino acid in a weight proportion comprised between 0.5 and 5, and more preferably between 0.5 and 2 times that of the $\alpha$-keto-acid. Generally, the global weight of the amino acids, when several are present, relative to that of the $\alpha$-keto-acid, or of the mixture of $\alpha$-keto-acids present, will fall within the above-indicated relative proportions.

The proportions in which the above-mentioned active ingredients, i.e. the $\alpha$-keto-acids and their cited edible derivatives and precursors, are present in the flavoring compositions of the invention can vary in a wide range of values, which is dependent on the nature of the other ingredients in said composition, as well as on the organoleptic effect that it is desired to achieve. By way of example, active ingredient concentrations of the order of 0.01 to 10% by weight, or even higher, relative to the weight of the composition, can typically be cited.

Another object of the invention is a process for the preparation of a flavoring composition such as described previously, characterized in that there is added to a mixture of one or more flavoring ingredients of natural or synthetic origin, together with current solvents or adjuvants, an active ingredient selected from the group consisting of the $\alpha$-keto-acids, their edible derivatives and precursors defined above, or yet the mixtures of two or more of these compounds.

According to a particular embodiment of this process, said active ingredient comprises one or several $\alpha$-keto-acids obtained via enzymatic conversion of the corresponding $\alpha$-amino-acids, by means of an enzymatic system capable of converting the latter, at least partially, into the corresponding $\alpha$-keto-acids.

According to an even more particular embodiment of this process, said $\alpha$-amino-acids are selected from the group consisting of 2-amino-butanoic acid, glycine, $\alpha$-alanine, norvaline, valine, aspartic acid, norleucine, leucine, isoleucine, serine, threonine, glutamic acid, phenylalanine, tyrosine, cysteine, methionine, lysine, tryptophane, histidine, arginine, asparagine, glutamine, cystine, citrulline, theanine, $\gamma$-methylene-glutamic acid and their salts, namely those of alkaline metals.

By flavoring ingredients it is meant here any natural or synthetic origin essential oils of current use for flavoring food products and of which many examples can be found in reference textbooks such as for example the book of P. Z. Bedoukian, Perfumery & Flavoring Synthetics, 2nd ed., Elsevier, Holland (1967), or yet Fenaroli's Handbook of Flavor Ingredients, 2nd ed., CRC Press, USA (1975). Of course, extracts or concentrates of flavoring substances obtained from fruits or plants, from milk, cheeses or any other products derived from milk, are also examples of flavoring ingredients in this sense.

Among the solvents and adjuvants of more current use, there can be cited, by way of example, triacetine, ethanol or propylene glycol, or yet the solid carriers such as a dextrine or arabic gum.

The flavoring compositions according to the invention can be used to modify and/or improve the taste of large variety of foods and beverages, as well as of pharmaceutical preparations, and these end-products are also the object of the invention. As examples, there can be cited the margarines and butters, as well as yoghurts, ice-creams and frozen desserts, cheeses, milk and milk-derived products, including drinks, but also the foodstuffs such as ready-to-eat cooked meals, soups, sauces, sweet or salty biscuits, cocktail snacks, in particular chips, or yet desserts. The use of these compositions for the flavoring of beverages is also advantageous, namely for carbonated drinks such as cola based drinks, lemonades and other.

The proportion in which said flavoring compositions can be added to the food products mentioned above can be quite variable, since they are a function of the nature of the product to be flavored and of the desired organoleptic effect. The person skilled in the art is moreover quite capable of choosing such concentrations as a function of these parameters, and yet of any others that may turn out to be relevant when using the flavoring compositions. As an indication, the compositions can be used in proportions of the order of the concentration in which the active ingredient is used, i. e. the α-keto-acid and/or its derivatives and precursors, or their mixtures, in the end-product, varying typically between 0.001 and 10 ppm, or even 20 ppm or more, by weight, relative to the weight of said end-product. More preferably, this concentration will be comprised between 0.01 and 5 ppm.

As cited above, the flavoring compositions of the invention reveal themselves particularly useful for improving or enhancing the mouthfeel of the foods and beverages into which they are incorporated.

More particularly, all the food products having a low fat content, the so-called "light" or low-calorie products, can be improved, as regards their texture and mouthfeel, by means of the flavoring composition according to the invention. The flavoring of such products presents a particular difficulty in that, whereas it is possible to compensate more or less successfully the gustative notes characteristic of the fat materials or fats, by adding the appropriate flavoring ingredients, there remains the problem related to the difficulty in reproducing, in the lightened product, the mouthfeel and the creamy type texture which are precisely imparted by said fats. This problem is particularly acute in the dairy products and in the light margarines, for which the use of the flavoring compositions according to the invention is very advantageous.

On the other hand, as previously cited, we have also observed that the α-keto-acids, and/or their derivatives and precursors described above, as well as the flavoring compositions containing them, are particularly useful for flavoring foods and drinks having a lightened sugar content, and namely those sweetened by way of Aspartame®, Sodium Cyclamate, Acesulfam® K, Sucralose®, or yet by means of mixtures of two or more of these compounds. It has in fact been observed that their taste became sweeter and closer to that of the equivalent food or beverage with a normal sugar content, i.e. more natural. In this context, even more remarkable effects were ascertained when an α-keto-acid was added in combination with one of the above-mentioned amino acids, and namely with the corresponding amino acid. Moreover, these compounds have also been found to reinforce the sweetening power of natural sugars such as saccharose, fructose, glucose, maltose, etc, thus also making it possible to reduce the amount of these sugars in the foodstuffs sweetened by way of natural sugars.

It must be pointed out that, when flavoring the food products mentioned above, the cc-keto-acids and their derivatives and precursors cited above can also be used either on their own, or in solution in solvents of current use in the art, without being incorporated beforehand in compositions containing other flavoring ingredients. This will be particularly the case when one or more of said keto-acids turns out to be efficient both to impart the desired taste and to improve the creamy and full character of the foodstuff, or yet its sweet character.

It is also clear that, either the compounds, or the flavoring compositions containing them, can be added to the edibles in a free state or in encapsulated form, namely spray-dried, by way of encapsulating materials of current use (proteins, gelatines, caseinates, hydrocolloides, dextrines, starch and modified starch, maltodextrines, sugars, etc) and according to the usual encapsulation techniques.

In short, the present invention also concerns a method to impart, improve or modify the taste and/or flavor of a flavoring composition or of a food product, characterized in that there is added to said composition or product an organoleptically effective amount of one or several compounds selected from the group consisting of the α-keto-acids in essentially pure form, as well as their edible derivatives and precursors, which can be formed from said acids, respectively liberate said acids, in the utilization medium.

This is therefore a very general flavoring method, allowing the preparation of flavored food products of varied nature and in particular of natural origin foods, or extracts thereof, enriched in the above-mentioned compounds via addition of the latter thereto according to the process of the invention.

According to preferred embodiments of this method, there will be added the specific α-keto-acids and/or their derivatives and precursors, as well as their mixtures, already repeatedly cited and described in detail in the examples which follow. More particularly, the process of the invention makes it possible to improve the fatty, creamy and rich character, i.e. the mouthfeel of the composition or food product. According to another embodiment, it makes it possible to enhance and render more natural the sweet taste of said composition or product, or to modify its sweetening power.

According to yet other embodiments, the process serves to impart or modify the organoleptic character of the composition or food.

Thus, the invention provides flavoring compositions and flavoring methods capable of imparting, improving or enhancing the organoleptic characteristics commonly associated with the presence of fats in foods, namely the creamy texture and the fuller and more voluminous mouthfeel. In this way, the compositions according to the invention can totally or partially replace these fat materials in a wide variety of light foods, but they can also serve to enhance the inherent organoleptic characteristics of these fats in the foods having a normal content in them. The foodstuffs which comprise the flavoring compositions according to the invention provide greater impact and a longer lasting taste in the mouth, and possess an improved mouthfeel over the corresponding foodstuffs not flavored according to the invention. Likewise, foods containing sugar or artificial replacements thereof, are improved upon addition thereto of the α-keto-acids, their cited derivatives or precursors, or the flavoring compositions according to the invention. In a general fashion, the compounds according to the invention thus serve to modify or impart the organoleptic characteristics of a large variety of flavoring compositions and food products.

Moreover, and in addition to the general applications of the active ingredients of the invention described heretofore, we have also established that the organoleptic effect of the preferred α-keto-acids mentioned above, and of their mixtures with the corresponding amino acids, could provide for nuanced behaviour in as much as one or another of these compounds revealed itself of an even more advantageous use for certain, more specific, types of aromatic applications.

Thus, for example, for meaty type applications, particularly successful results were obtained with the 2-oxobutanoic, oxalacetic, 3-methyl-2-oxo-butanoic, 3-methyl-2-oxo-pentanoic, 2-oxo-glutaric and 3-mercapto-2-oxo-propanoic acids. These compounds render the taste of meat type flavors, namely chicken, pork or beef type, rounder and juicier, meatier, and reinforce the grilled, roasted notes of the meat type compositions, while enhancing the intensity and lastiness of their gustative effect in the mouth. These acids seem to have a particularly marked effect on the phenolic, pyrazinic, sulphur and aldehydic fractions, or yet on the fatty acids, of the meat type flavors. In this context, preferred embodiments of the invention relate to the flavoring compositions containing one or more of said acids, in combination with one or several compounds selected from the group consisting of isoeugenol, 2-propylphenol, p-vinylguaiacol, 2-acetylpyrazine, 2-ethyl-3,5-dimethylpyrazine, 2,3,5-trimethylpyrazine, 2,3-diethyl-5-methylpyrazine, 3-ethyl-2-methylpyrazine, dimethyl sulphide, dimethyl disulphide, dimethyl trisulphide, methylpropyl disulphide, 2-methylthiophenol, methional (3-methyl-thiopropanal), 2-octenal, 2,4-nonadienal, 2,4-decadienal, 2,4-undecadienal, 2-methoxybenzaldehyde, 2,4-dodecadienal, decenal, methyl 2-furanecarboxylate, Furaneol® (4-hydroxy-2,5-dimethyl-3(2H)-furanone; origin: Firmenich SA, Geneva, Switzerland), 2-ethyl-4-hydroxy-3-methyl-5(2H)-furanone (origin: Firmenich SA, Geneva, Switzerland), 2,6-dimethylbenzenethiol, 2-nonen-1-ol, 10-undecenoic acid, undecanoic acid, isodecanoic acid and isononanoic acid.

Among these flavoring compositions, those containing 3-mercapto-2-oxo-propanoic acid, in combination with one or more of the above-mentioned compounds, turned out to be particularly appropriate for the aims of the invention.

It was also observed that an enhancement of the roasted notes of this type of flavors could be obtained upon using 2-oxo-butanoic acid in combination with one or more compounds selected from the group consisting of methyl 2-furanecarboxylate, Furaneol®, 2-ethyl-3,5-dimethylpyrazine, methional, 2-acetylpyrazine, 2-ethyl-4-hydroxy-3-methyl-5(2H)-furanone and undecanoic and 10-undecenoic acids.

Likewise, 2-oxo-glutaric acid seems to reinforce in particular the fatty notes of the meat type flavors and, to this end, it is especially useful when used in combination with 2-nonen-1-ol, 2-decenal and/or 2,4-decadienal. For example, flavoring compositions having a richer and fattier taste, also more roasted, grilled and crusty, were obtained by using 3-methyl-2-oxo-pentanoic acid together with one or several compounds selected from the group consisting of iso-decanoic, iso-nonanoic, 10-undecenoic and undecanoic acids, Furaneol®, 2,3,5-trimethylpyrazine and 2,3-diethyl-5-methylpyrazine.

In the area of vegetable type applications, particularly advantageous effects could be obtained with 2-oxo-butanoic, 3-methyl-2-oxo-butanoic, 3-methyl-2-oxo-pentanoic or yet 4-methyl-2-oxo-pentanoic acids. For example, enriching effects in tomato type flavors can be obtained by using namely 2-oxo-butanoic acid together with one or more compounds amongst the octanoic, butyric and isovalerianic acids, 5-dodecanolide, methional and dimethyl sulphide. The above-mentioned oxo-acid enhances the roundness and the juicy character imparted by these compounds to the tomato flavor. As for 3-methyl-2-oxo-butanoic acid, its effect is to enhance the impact and the cooked character of the flavor, typically due to compounds such as methylmercaptan, methional, dimethyl sulphide, eugenol, 5-methylfurfural, vanillin or yet 3,4-dimethyl-1,2-cyclopentanedione. 4-Methyl-2-oxo-pentanoic acid, on the other hand, reinforces the juicy, meaty and fleshy notes and combines well, to this effect, with one or several compounds amongst methional, dimethyl sulphide, eugenol, orthocresol or yet guaiacol, whereas 3-methyl-2-oxo-pentanoic acid can improve the fullness and impact of compositions and flavors containing one or more ingredients selected from the group consisting of the sulphur compounds mentioned above, as well as of isobutyl acetate, hexanal and 2-hexenal, linalyl benzoate, linalyl caproate and hexyl 2-butenoate.

In asparagus type flavors in particular, it was observed that 2-oxo-butanoic, 3-methyl-2-oxo-butanoic and 3-methyl-2-oxo-pentanoic acids enhanced the pyrazinic, woody notes of the flavor and that they rendered this type of flavor creamier and sweeter. Oxalacetic acid on the other hand enhances the impact of the flavor, by reinforcing the organoleptic effect of compounds such as dimethyl sulphide, methylmercaptan and 2-methyl-1-benzenethiol. Other α-keto-acids having a positive effect on this type of flavor are cited in the examples.

Other advantageous results were obtained with 3-methyl-2-oxo-pentanoic acid, in combination with methylmercaptan, dimethyl sulphide and 3-methyl-3(5)-(methylthio)pyrazine. The compositions thus obtained were able to particularly increase the strength and impact of the corn type flavors. For this type of flavors, 3-methyl-2-oxo-butanoic acid is also useful, namely when employed in combination with sulphur ingredients such as dimethyl sulphide or methylmercaptan, which impact is enhanced and the sulphur character of which becomes rounder.

The use of 2-oxo-butanoic, 3-methyl-2-oxo-butanoic, 3-methyl-2-oxo-pentanoic and 2-oxo-glutaric acids turns out to be particularly advantageous for the preparation of celery type flavoring compositions, the flavor of which becomes more powerful and rounded upon the addition thereto of one or more of these acids. In this context, flavoring compositions containing these compounds in combination with at least one of the compounds selected from the group consisting of 2,6-nonadienol, cis-4-hexenol, hexanal, trans-2-hexenal, 3-propylidenephthalide (3-propylidene-1-benzo[c]furanone), 3-n-butylidenephthalide, as well as the carrot, celery, juniper and lovage essential oils, are preferred.

Moreover, the same α-keto-acids, as well as 3-mercapto-2-oxo-propanoic acid, also have a particularly rich effect on the fullness and impact of the cheese type flavors, namely when said acids are used in combination with compounds such as methional, dimethyl sulphide, methyl 3-methylthiopropanoate, 2-heptanone or 2-nonanone, δ-decalactone or δ-dodecalactone, propanoic, butyric, isobutyric, pentanoic, caproic, caprilic or capric acids, and the mixtures of two or more of the above-mentioned compounds.

Amongst the α-keto-acids of the invention, 3-methyl-2-oxo-butanoic acid, and its mixtures with valine, provide much appreciated effects when used in flavoring compositions of the vanilla or cereal, or yet chocolate type. It was observed, for example, that these compounds rendered the vanilla aromatic note more rounded and that they could also be advantageously used in combination with compounds selected amongst acetylmethylcarbinol, acetylpropionyl, diacetyl, 1-phenyl-1,2-propanedione, 5-dodecanolide, 4-heptanolide, 4-octanolide, 3-hydroxy-2-methyl-4(4H)-pyranone, 6-methyl-3,5-heptadien-2-one, furfural, 3,4-dimethyl-1,2-cyclopentanedione, eugenol, Perou Baume or yet vanillin. More particularly, 3-methyl-2-oxo-butanoic acid renders the butter notes of this type of compositions even more buttery, creamy and vanilla like and enhances the creamy, coconut effect of the lactonic compounds, while softening and rounding the burnt, brown, vanilla and phenolic notes.

Examples presented further on also illustrate the enriching effect in the cereal or chocolate type compositions. Furthermore, it has been observed that this α-keto-acid (or its sodium salt), alone or in admixture with valine, has a particularly useful bearing on Furaneol® or on 2-ethyl-4-hydroxy-3-methyl-5(2H)-furanone (origin: Firmenich SA, Geneva, Switzerland). The addition of 3-methyl-2-oxo-butanoic acid to these compounds enhances their sweetening, caramel effect and brings a more marked fruity, strawberry and slightly pineapple note to their taste, while also acting on the roundness of their characteristic flavor. Said roundness is further reinforced upon adding said acid in admixture with valine, the latter imparting an even more burnt, brown sugar and molasses character, in particular to the above-mentioned furanone. The sweetening power of said compounds is thus enhanced. The flavoring compositions formed of these ingredients are therefore particularly appreciated.

In cheese or dairy type applications, one can still cite the useful effects obtained with 3-(4-hydroxyphenyl)-2-oxo-propanoic acid. Thus, it has been established that this keto-acid reinforces the fat notes and the fruity impact of compounds such as butyric, hexanoic, octanoic, decanoic, isobutyric, isovalerianic, pentanoic, 3-phenylpropanoic or propanoic acids, and that it can therefore be advantageously used in admixture with one or more of these compounds. Useful effects were thus observed with condensed milk type flavors (for example, 504 133 TH; origin: Firmenich SA, Geneva, Switzerland) or cheese type (for example, 504 132 TH; origin: Firmenich SA, Geneva, Switzerland) wherein the above-mentioned keto-acid was present in proportions comprised between about 0.5 and 50 ppm by weight, relative to the weight of the flavor.

Finally, many α-keto-acids amongst those previously cited revealed themselves useful for applications in so-called "light" beverages, i.e. artificially sweetened drinks, and more particularly those which are cola based. Some of said acids showed remarkable effects on several types of artificial sweeteners, whereas other acids had more marked effects on one or another of said sweeteners in particular. Thus, amongst the former, 3-methyl-2-oxo-butanoic acid and its mixtures with L-valine, 3-methyl-2-oxo-pentanoic acid and its mixtures with L-isoleucine and 2-oxo-glutaric acid and its mixtures with L-glutamic acid, can be cited. These compounds provide general improvement in the taste of beverages containing Aspartame®, Sodium Cyclamate, Sucralose®, Acesulfam® K or their mixtures.

Practically all the preferred keto-acids previously cited have a useful influence on the sweetening activity of Aspartame® and the examples presented further on illustrate particularly advantageous instances of their use.

In addition, acids such as 2-oxo-butanoic, 4-methyl-2-oxo-pentanoic, 3-hydroxy-2-oxo-butanoic (alone or in admixture with L-serine), 4-(methylthio)-2-oxo-butanoic, 2-oxo-1H-imidazole-4-propanoic and 3-mercapto-2-oxo-propanoic acid, are capable of enhancing and rendering more natural the taste of drinks containing Sucralose®, whereas the two latter-mentioned acids and 2-oxo-1H-indole-3-propanoic acid have a more marked positive effect on the sweet taste imparted by Sodium cyclamate.

Numerous other examples of the richness and variety of organoleptic effects that can be obtained according to the invention by means of the α-keto-acids and their mixtures could be further given, namely those relating to the advantageous flavoring compositions which result from using, for example, 2-oxo-butanoic, 3-hydroxy-2-oxo-butanoic, 2-oxo-glutaric and/or 3-mercapto-2-oxo-propanoic acids, in admixture with monosodium glutamate, the taste of which is thereby improved, when compared to the use of this compound on its own.

Thus, it will become noticeable that the scope of the present invention is very large, the latter concerning, generally, any use as a flavoring ingredient, of any compound selected from the group consisting of the α-keto-acids in essentially pure form, as well as their edible derivatives and precursors which can be formed from said acids, respectively liberate said acids, in the utilization medium, and which is characterized in that said selected compound is added to a flavoring composition or to a food product, in an amount sufficient to modify the taste and/or flavor of said composition or of said product, and more particularly its fatty, creamy and rich type characteristics, its sweet or sugar type character, or, globally, its general organoleptic character.

The α-keto-acids used according to the invention are, in many cases, commercially available. Alternatively, they can be prepared from commercial products and by means of conventional type reactions. Likewise, the preparation of their alkaline metal salts and of their alkyl esters, when the latter are not available on the market, requires resorting to well-known reactions.

The precursors such as the amino acids cited above are also often commercial products.

Moreover, certain active ingredients such as the mixtures of several α-keto-acids, optionally containing the corresponding amino acids, can be obtained by enzymatic reactions (oxidations, deaminations or transaminations) of natural origin protein hydrolysates. To this effect, enzymes capable of partially or totally converting the amino acids present can be used. Clearly, mixtures of α-keto-acids can also be obtained in this manner, for example through the combined action of an oxidase and a catalase on a mixture of the corresponding amino acids. Depending on the activity and specificity of the enzyme, the nature of the starting amino acids mixture, and the duration of the enzymatic reaction, the conversion of the starting mixture may be complete, leading to a mixture of the corresponding cc-keto-acids, or only partial, providing then a mixture of amino acids and α-keto-acids, this once the enzymatic system has been separated. It is clear that a separation is however unnecessary when the latter is a denatured enzyme system having no harmful effects on the organoleptic properties of the mixture, and the latter can then be used as obtained as flavoring composition according to the invention.

Following an example of enzymatic preparation of a mixture of α-keto-acids, we proceeded as follows: there were mixed, in equivalent molar proportions (0.1 mmole of each), L-methionine, L-phenylalanine, L-leucine, L-tryptophane and L-isoleucine. This commercial origin amino acid mixture was then enzymatically converted in aqueous solution, under the following reaction conditions:

pH~7.2 (by means of 6 ml of sodium pyrophosphate 0.05 M)

6 mg of L-amino-acid oxidase (E.C. 1.4.3.2, Bothrops Atrox; origin: Sigma Chemical Co.)

0.1–1 mg of ox liver catalase (origin: Fluka 60632)

slight air (or oxygen) flow temperature: 37° C.

reaction time: 12–48 h

After 48 h of reaction, a thin layer chromatography analysis indicated a 100% conversion of the cited amino acids into the corresponding α-keto-acids. The reaction product was then pasteurized to denature the enzymes, centrifuged and concentrated to provide a mixture containing equivalent amounts of 4-(methylthio)-2-oxo-butanoic, 2-oxo-3-phenylpropanoic, 4-methyl-2-oxo-pentanoic, 2-oxo-1H-indole-3-propanoic and 3-methyl-2-oxo-pentanoic acids.

The invention will now be described in further detail by way of the following examples, wherein the α-keto-acids used according to the invention are designated by the numbers indicated in the table hereinafter:

TABLE

| Compound | Corresponding number |
| --- | --- |
| Glyoxylic acid | Compound 1 |
| 2-Oxo-propanoic acid | Compound 2 |
| 2-Oxo-butanoic acid | Compound 3 |
| 3-Methyl-2-oxo-butanoic acid | Compound 4 |
| 3-Methyl-2-oxo-pentanoic acid | Compound 5 |
| 4-Methyl-2-oxo-pentanoic acid | Compound 6 |
| 3-Hydroxy-2-oxo-propanoic acid | Compound 7 |
| 3-Hydroxy-2-oxo-butanoic acid | Compound 8 |
| Oxalacetic acid | Compound 9 |
| 2-Oxo-glutaric acid | Compound 10 |
| 2-Oxo-3-phenyl-propanoic acid | Compound 11 |
| 3-(4-Hydroxyphenyl)-2-oxo-propanoic acid | Compound 12 |
| 2-Oxo-1H-indole-3-propanoic acid | Compound 13 |

TABLE-continued

| Compound | Corresponding number |
| --- | --- |
| 4-(Methylthio)-2-oxo-butanoic acid | Compound 14 |
| 5-Guanidino-2-oxo-pentanoic acid | Compound 15 |
| 6-Amino-2-oxo-hexanoic acid | Compound 16 |
| 2-Oxo-1H-imidazole-4-propanoic acid | Compound 17 |
| 3-Mercapto-2-oxo-propanoic acid | Compound 18 |
| 3-Methyl-2-oxo-hexanoic acid | Compound 19 |
| 3-Methyl-2-oxo-heptanoic acid | Compound 20 |

Compounds 19 and 20, which are not available commercially, as well as their methyl esters, were prepared by means of conventional reactions, according to the following scheme:

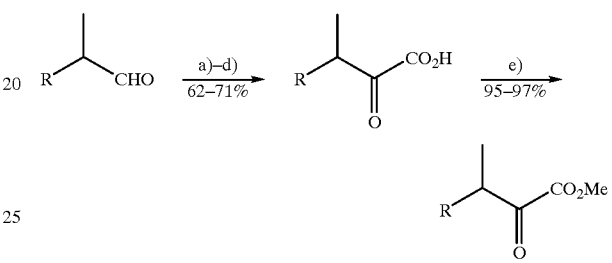

In addition, in these examples, the concentrations of the ingredients indicated in the tables are always cited in parts by weight of ingredient, relative to the weight of the evaluated end-product, whether it is a saline or sugar aqueous solution, or a ready-to-eat food product.

EMBODIMENTS OF THE INVENTION

EXAMPLE 1

Butter Type Flavoring Compositions

To a 0.5% NaCl aqueous saline solution there were added the following ingredients, in the proportions indicated, to prepare flavored solutions containing the flavoring compositions A to J.

TABLE

| Ingredient | Flavoring composition (ppm) | | | | | | | | | |
| --- | --- | --- | --- | --- | --- | --- | --- | --- | --- | --- |
| | A | B | C | D | E | F | G | H | I | J |
| Base flavor* | 1000 | 1000 | 1000 | 1000 | 1000 | 1000 | 1000 | 1000 | 1000 | 1000 |
| Compound 3 | — | 0.3 | — | — | — | — | — | — | — | — |
| Compound 4 | — | — | 0.3 | — | — | — | — | — | — | — |
| Compound 5 | — | — | — | 0.3 | — | — | — | — | — | — |
| Compound 7 | — | — | — | — | 0.3 | — | — | — | — | — |
| Compound 10 | — | — | — | — | — | 0.3 | — | — | — | — |
| Compound 11 | — | — | — | — | — | — | 0.3 | — | — | — |
| Compound 12 | — | — | — | — | — | — | — | 0.3 | — | — |
| Compound 14 | — | — | — | — | — | — | — | — | 0.3 | — |
| Compound 18 | — | — | — | — | — | — | — | — | — | 0.3 |

*butter type, 504.131 CE; origin: Firmenich SA, Geneva, Switzerland

The saline solutions thus obtained were submitted, for evaluation on a blind test, to a panel of expert flavorists, composed of at least ten individuals.

The result of this evaluation showed that the solutions containing compositions B to J were preferred by a majority of flavorists, relative to that of base composition A, the solutions containing compositions C to D, H and J having been particularly appreciated. According to the flavorists, the addition of the compounds mentioned in the table to the base flavor had as an effect to enhance the creamy character of the latter and to reinforce its roundness, rendering the taste of this flavor closer to that of natural butter. This improvement of the flavor's mouthfeel was moreover particularly marked in composition E.

Thus, this composition E was then retaken and serine was added to it, at a rate of 0.15 ppm, 0.3 ppm and 0.6 ppm by weight, relative to the weight of the saline solution, to prepare three novel solutions which were then submitted, together with that of composition E, for evaluation on a blind test, to the same panel of expert flavorists. Once more, the latter had to indicate their preference concerning the organoleptic properties of the four solutions. According to their unanimous opinion, the novel solutions containing the compositions modified by means of the serine, had an even creamier character than that of the solution containing composition E, and their animal note was better covered. Their taste was also judged to be longer lasting in the mouth.

EXAMPLE 2
Flavoring of Margarines

To a commercial "low fat" margarine (Sobluma Minical, 40% fat; origin: Migros, Switzerland) there were added the flavoring compositions according to the invention containing the following ingredients, in the proportions indicated hereinafter:

| Ingredient | Composition (ppm) | | | |
|---|---|---|---|---|
| | A | B | C | D |
| Butter type flavor * | 1200 | 1200 | 1200 | 1200 |
| Compound 7 | 0.4 | 0.4 | 0.4 | 0.4 |
| Serine | — | 0.2 | 0.4 | 0.8 |

* 504.131 CE; origin: Firmenich SA, Geneva, Switzerland

There were thus obtained 4 samples of flavored margarine, which were then evaluated on a blind test by a panel of expert flavorists and compared to a base sample containing 1200 ppm by weight of the butter type base flavor mentioned above, relative to the weight of margarine.

The results of these evaluations showed that the samples flavored by means of the compositions A to D according to the invention were always preferred to said base sample, as regards their mouthfeel. According to the flavorists, the sample containing composition A had an enhanced taste of fresh butter, fatter and richer than that of the base sample, while the creamy character of the margarine containing composition B was even more pronounced, relative to that of the sample flavored by means of composition A. On the other hand, the occurrence of even creamier and fattier notes, recalling melted butter, could be noticed in the samples of margarine flavored with composition C and those which contained composition D were almost too creamy, very full and with an enhanced mouthfeel.

Similar tests were carried out with a commercial margarine far richer in fat (Mibona Classic, 83% fat; origin: Migros, Switzerland), to which there were added the compositions cited hereinafter:

| Ingredient | Composition (ppm) | | | |
|---|---|---|---|---|
| | E | F | G | H |
| Butter type flavor * | 1000 | 1000 | 1000 | 1000 |
| Compound 7 | 0.4 | 0.4 | 0.4 | 0.4 |
| Serine | — | 0.2 | 0.4 | 0.8 |

* 504.131 CE; origin: Firmenich SA, Geneva, Switzerland

When the four samples of flavored margarine were evaluated under the conditions mentioned above and compared to a base sample flavored solely by means of the butter type flavor cited (1000 ppm), similar organoleptic effects to those mentioned above were observed. Furthermore, the flavorists indicated that the incorporation of serine, in addition to the 3-hydroxy-2-oxo-propanoic acid, not only enhanced the creamy character of the margarine and prolonged its impact in the mouth, but also allowed better disguising of the animal note of the flavor, thus rendering its taste more balanced and more like that of fresh butter.

EXAMPLE 3
Cheese Type Flavoring Compositions

To a 0.5% NaCl aqueous saline solution there were added the following ingredients, in the proportions indicated, to prepare flavored solutions containing the flavoring compositions A to K.

TABLE

| Ingredient | Flavoring composition (ppm) | | | | | | | | | | |
|---|---|---|---|---|---|---|---|---|---|---|---|
| | A | B | C | D | E | F | G | H | I | J | K |
| Base flavor* | 1000 | 1000 | 1000 | 1000 | 1000 | 1000 | 1000 | 1000 | 1000 | 1000 | 1000 |
| Compound 3 | — | 0.5 | — | — | — | — | — | — | — | — | — |
| Compound 4 | — | — | 0.5 | — | — | — | — | — | — | — | — |
| Compound 5 | — | — | — | 0.5 | — | — | — | — | — | — | — |
| Compound 6 | — | — | — | — | 0.5 | — | — | — | — | — | — |
| Compound 7 | — | — | — | — | — | 0.5 | — | — | — | — | — |
| Compound 10 | — | — | — | — | — | — | 0.5 | — | — | — | — |
| Compound 12 | — | — | — | — | — | — | — | 0.5 | — | — | — |
| Compound 13 | — | — | — | — | — | — | — | — | 0.5 | — | — |
| Compound 14 | — | — | — | — | — | — | — | — | — | 0.5 | — |
| Compound 18 | — | — | — | — | — | — | — | — | — | — | 0.5 |

*cheese type, 504.132 CE; origin: Firmenich SA, Geneva, Switzerland

The saline solutions thus obtained were submitted for evaluation on a blind test to a panel of expert flavorists composed of at least ten individuals. The results of this evaluation showed that the solutions containing compositions B to K were preferred by a majority of flavorists, relative to that of base composition A. In their opinion, they all possessed an enhanced creamy character and had better impact in the mouth than the base solution. This improving effect on the mouthfeel of the flavor was, moreover, particularly marked in compositions C, D, G, H and K.

EXAMPLE 4
Condensed Milk Type Flavoring Compositions

Solutions in spring water were prepared with the following ingredients, added to the water in the proportions indicated.

TABLE

| Ingredient | Flavoring composition (ppm) | | | | | | | | | |
|---|---|---|---|---|---|---|---|---|---|---|
| | A | B | C | D | E | F | G | H | I | J |
| Base flavor* | 1000 | 1000 | 1000 | 1000 | 1000 | 1000 | 1000 | 1000 | 1000 | 1000 |
| Compound 3 | — | 0.5 | — | — | — | — | — | — | — | — |
| Compound 4 | — | — | 0.5 | — | — | — | — | — | — | — |
| Compound 5 | — | — | — | 0.5 | — | — | — | — | — | — |
| Compound 7 | — | — | — | — | 0.5 | — | — | — | — | — |
| Compound 9 | — | — | — | — | — | 0.5 | — | — | — | — |
| Compound 11 | — | — | — | — | — | — | 0.5 | — | — | — |
| Compound 12 | — | — | — | — | — | — | — | 0.5 | — | — |
| Compound 14 | — | — | — | — | — | — | — | — | 0.5 | — |
| Compound 18 | — | — | — | — | — | — | — | — | — | 0.5 |

*condensed milk type, 504.133 CE; origin: Firmenich SA, Geneva, Switzerland

When the solutions thus obtained were submitted for evaluation on a blind test to a panel of expert flavorists, who were expected to pronounce themselves on their preference with regard to the organoleptic qualities thereof, a clear preference for those containing compositions B, C, E, G and J emerged. The taste of these solutions was judged distinctly better than that of the solution containing the base flavor, fuller and having more impact in the mouth. Furthermore, in the flavorists' opinion, all the solutions B to J were preferred to the base solution for their rounder and more full-bodied character, but the five solutions mentioned above presented the best mouthfeel and a more natural character.

EXAMPLE 5

Flavoring of a Cola Based Drink

Flavored samples of a cola based beverage were prepared by adding to a commercial "light" cola the following ingredients, in the proportions indicated:

TABLE

| Ingredient | Flavored sample (ppm) | | | | | | | | | | |
|---|---|---|---|---|---|---|---|---|---|---|---|
| | A | B | C | D | E | F | G | H | I | J | K |
| Compound 3 | 0.03 | — | — | — | — | — | — | — | — | — | — |
| Compound 4 | — | 0.03 | — | — | — | — | — | — | — | — | — |
| Compound 5 | — | — | 0.03 | — | — | — | — | — | — | — | — |
| Compound 6 | — | — | — | 0.03 | — | — | — | — | — | — | — |
| Compound 7 | — | — | — | — | 0.03 | — | — | — | — | — | — |
| Compound 9 | — | — | — | — | — | 0.03 | — | — | — | — | — |
| Compound 10 | — | — | — | — | — | — | 0.03 | — | — | — | — |
| Compound 11 | — | — | — | — | — | — | — | 0.03 | — | — | — |
| Compound 12 | — | — | — | — | — | — | — | — | 0.03 | — | — |
| Compound 14 | — | — | — | — | — | — | — | — | — | 0.03 | — |
| Compound 18 | — | — | — | — | — | — | — | — | — | — | 0.03 |

The samples thus obtained were evaluated on a blind test by a panel of expert flavorists, with regard to the commercial product.

The panel judged that all the samples A to K had a clearly enhanced gustative impact relative to the commercial product, giving a rounder and fuller impression, more natural and closer to the taste of a non-light Coca Cola. These effects were particularly noticeable in samples A, C, D and F to I, which were preferred.

Similar tests were carried out with a commercial Coca Cola which was not lightened in sugar, to which there were added, at a rate of 0.04 ppm, the compounds 3, 5, 6, 9, 10, 11 and 12. It was then ascertained that the addition of the latter also improved the taste of this product, provoking a fuller sensation in the mouth, with more body and volume. This mouthfeel improvement was more marked in this case with compounds 3, 6, 9, 10 and 12.

EXAMPLE 6

Flavoring of an Orange Drink

Flavored samples of a drink having an orange taste were prepared by adding to a commercial product (Fanta® Orange) the following ingredients, in the proportions indicated:

TABLE

| Ingredient | Flavored sample (ppm) | | | |
|---|---|---|---|---|
| | A | B | C | D |
| Compound 5 | 0.06 | — | — | — |
| Compound 6 | — | 0.06 | — | — |
| Compound 9 | — | — | 0.06 | — |
| Compound 10 | — | — | — | 0.06 |

The samples thus obtained were evaluated on a blind test by a panel of expert flavorists, relative to the commercial product.

The result of this evaluation showed that all the flavored samples were preferred to the commercial product by a majority of flavorists. Furthermore, sample B was unanimously selected as being the best, from the point of view of the mouthfeel and for its more natural and sweeter taste.

EXAMPLE 7

Flavoring of a Lemonade

A commercial origin lemonade (Henniez® Fruitastic Citronette) was flavored by adding thereto the following ingredients, in the proportions indicated:

TABLE

| Ingredient | Flavored sample (ppm) | | | | |
|---|---|---|---|---|---|
| | A | B | C | D | E |
| Compound 3 | 0.06 | — | — | — | — |
| Compound 6 | — | 0.06 | — | — | — |
| Compound 9 | — | — | 0.06 | — | — |
| Compound 10 | — | — | — | 0.06 | — |
| Compound 12 | — | — | — | — | 0.06 |

The samples thus obtained were evaluated on a blind test by a panel of expert flavorists, relative to the commercial product.

The result of this evaluation showed that all the flavored samples were preferred to the commercial product by a majority of flavorists. In addition, samples B and C were particularly preferred for their more natural taste and better impact in the mouth.

EXAMPLE 8

Flavoring of a Beer

To a commercial beer without alcohol (Moussy ® Switzerland) there were added the following ingredients, in the proportions indicated, to prepare flavored beers.

TABLE

| Ingredient | Flavored sample (ppm) | | | | | |
|---|---|---|---|---|---|---|
| | A | B | C | D | E | F |
| Compound 3 | 0.06 | — | — | — | — | — |
| Compound 5 | — | 0.06 | — | — | — | — |
| Compound 6 | — | — | 0.06 | — | — | — |
| Compound 9 | — | — | — | 0.06 | — | — |
| Compound 10 | — | — | — | — | 0.06 | — |
| Compound 11 | — | — | — | — | — | 0.06 |

When the thus obtained flavored samples were compared on a blind test, by a panel of expert flavorists, with the commercial beer having no alcohol, a clear preference for the flavored beers emerged, the latter having been judged to possess a rounder and fuller taste than that of the base beer, such that the impact in the mouth of the flavored beers was judged far more similar to that of a beer having a normal content in alcohol. Moreover, these effects were at their best in samples C and E.

EXAMPLE 9

Vanilla Type Flavoring Compositions

To an aqueous solution having a 10% sugar content there were added the following ingredients, in the proportions indicated, to prepared flavored solutions containing the flavoring compositions A to G.

TABLE

| Ingredient | Flavoring composition (ppm) | | | | | | |
|---|---|---|---|---|---|---|---|
| | A | B | C | D | E | F | G |
| Base flavor* | 100 | 100 | 100 | 100 | 100 | 100 | 100 |
| Compound 4 | — | 1.0 | — | — | — | — | — |
| Compound 5 | — | — | 1.0 | — | — | — | — |
| Compound 7 | — | — | — | 1.0 | — | — | — |
| Compound 11 | — | — | — | — | 1.0 | — | — |
| Compound 13 | — | — | — | — | — | 1.0 | — |
| Compound 14 | — | — | — | — | — | — | 1.0 |

*vanilla type, 502.807 A; origin: Firmenich SA, Geneva, Switzerland

The solutions thus obtained were then submitted for evaluation on a blind test to a panel of expert flavorists, composed of at least ten individuals.

According to the flavorists' opinion, the solutions containing the compositions B to G all possessed a creamier character and produced a longer lasting gustative effect than that of the base composition A. This mouthfeel improvement of the base flavor was particularly marked for the solutions which contained compositions B, D and G, whereas the vanilla pod type note of compositions C and E appeared reinforced relative to that of composition A.

It was also observed that the addition, to the base flavor, of compounds 19 or 20, or of their methyl ester, in concentrations of the order of 0.5 to 5 ppm by weight, also improved the taste of the base flavor, rendering it softer, more milky and vanilla like.

EXAMPLE 10

Chocolate Type Flavoring Compositions

To an aqueous solution having a 10% sugar content there were added the following ingredients, in the proportions indicated, to prepare flavored solutions containing the flavoring compositions A to H.

TABLE

| Ingredient | Flavoring composition (ppm) | | | | | | | |
|---|---|---|---|---|---|---|---|---|
|  | A | B | C | D | E | F | G | H |
| Base flavor* | 100 | 100 | 100 | 100 | 100 | 100 | 100 | 100 |
| Compound 2 | — | 1.0 | — | — | — | — | — | — |
| Compound 3 | — | — | 1.0 | — | — | — | — | — |
| Compound 4 | — | — | — | 1.0 | — | — | — | — |
| Compound 6 | — | — | — | — | — | — | — | — |
| Compound 11 | — | — | — | — | — | 1.0 | — | — |
| Compound 13 | — | — | — | — | — | — | 1.0 | — |
| Compound 14 | — | — | — | — | — | — | — | 1.0 |

*chocolate type, 503.313 A; origin: Firmenich SA, Geneva, Switzerland

The solutions thus obtained were submitted for evaluation on a blind test to a panel of expert flavorists, who had to indicate their preferences with regard to the organoleptic properties of the solutions. The results of this evaluation brought out the remarkable changes operated on the organoleptic profile of the base flavor, particularly in the case of compositions C, D, E, F, G and H, the solutions of which had a far stronger taste, more reminiscent of the black chocolate taste, more powdery and fuller, and even more alcoholic than that of the solution of composition A. In addition, they had a far creamier and richer impact in the mouth.

EXAMPLE 11
Coffee Type Flavoring Compositions

To an aqueous solution having a 10% sugar content there were added the following ingredients, in the proportions indicated, to prepare flavored solutions containing the flavoring compositions A to F.

TABLE

| Ingredient | Flavoring composition (ppm) | | | | | |
|---|---|---|---|---|---|---|
|  | A | B | C | D | E | F |
| Base flavor * | 100 | 100 | 100 | 100 | 100 | 100 |
| Compound 2 | — | 1.0 | — | — | — | — |
| Compound 3 | — | — | 1.0 | — | — | — |
| Compound 4 | — | — | — | 1.0 | — | — |
| Compound 7 | — | — | — | — | 1.0 | — |
| Compound 13 | — | — | — | — | — | 1.0 |

* coffee type, 502.334 A; origin: Firmenich SA, Geneva, Switzerland

These solutions were evaluated on a blind test by a panel of expert flavorists, the majority of whom indicated a preference for the solutions containing compositions B to F. More particularly, they judged that the solutions of compositions B, D and E had an enhanced creamy and butter character relative to that of the base solution, with a note of freshly ground coffee and a long lasting mouthfeel effect. On the other hand, the additional notorious change in the solutions of compositions C and F, relative to that of the base composition A, was the enhancement of the roast, burnt, black coffee type note, with greater intensity of the "expresso" type character.

EXAMPLE 12
Flavoring of a Tea Based Beverage

To a commercial tea beverage (Lipton® Light, sweetened with Aspartame ®) there were added the following ingredients, in the proportions indicated, to prepare flavored drinks.

TABLE

| Ingredient | Flavored sample (ppm) | | | | | | |
|---|---|---|---|---|---|---|---|
|  | A | B | C | D | E | F | G |
| Compound 5 | 1.2 | — | — | — | — | — | — |
| Compound 6 | — | 1.2 | — | — | — | — | — |
| Compound 7 | — | — | 1.2 | — | — | — | — |
| Compound 11 | — | — | — | 1.2 | — | — | — |
| Compound 12 | — | — | — | — | 1.2 | — | — |
| Compound 13 | — | — | — | — | — | 1.2 | — |
| Compound 18 | — | — | — | — | — | — | 1.2 |

When the flavored drinks thus obtained were compared on a blind test by a panel of expert flavorists with the commercial tea, there appeared a distinct preference for the flavored drinks, which were judged of a less bitter and rounder taste, the powdery note of the Aspartame ® having also being reduced relative to that of the commercial tea, with the result that the sweetness of the latter was enhanced. Such effects were particularly marked in samples A to C and D, the taste of which was closer to that of a normally sugared drink than that of the commercial tea. In addition, drink A had acquired a fruity, blackberry type note, whereas sample F possessed an interesting fermented, dry leaf character.

EXAMPLE 13
Meat Type Flavoring Compositions

To a 0.5% NaCl aqueous saline solution there were added the following ingredients, in the proportions indicated, to prepare flavored solutions containing the flavoring compositions A to K.

TABLE

| Ingredient | Flavoring composition (ppm) | | | | | | | | | | |
|---|---|---|---|---|---|---|---|---|---|---|---|
|  | A | B | C | D | E | F | G | H | I | J | K |
| Base flavor* | 20 | 20 | 20 | 20 | 20 | 20 | 20 | 20 | 20 | 20 | 20 |
| Compound 2 | — | 0.5 | — | — | — | — | — | — | — | — | — |
| Compound 3 | — | — | 0.5 | — | — | — | — | — | — | — | — |
| Compound 6 | — | — | — | 0.5 | — | — | — | — | — | — | — |
| Compound 7 | — | — | — | — | 0.5 | — | — | — | — | — | — |
| Compound 9 | — | — | — | — | — | 0.5 | — | — | — | — | — |
| Compound 11 | — | — | — | — | — | — | 0.5 | — | — | — | — |
| Compound 12 | — | — | — | — | — | — | — | 0.5 | — | — | — |
| Compound 13 | — | — | — | — | — | — | — | — | 0.5 | — | — |

TABLE-continued

| Ingredient | Flavoring composition (ppm) | | | | | | | | | | |
|---|---|---|---|---|---|---|---|---|---|---|---|
| | A | B | C | D | E | F | G | H | I | J | K |
| Compound 14 | — | — | — | — | — | — | — | — | — | 0.5 | — |
| Compound 18 | — | — | — | — | — | — | — | — | — | — | 0.5 |

*roastbeef type, 504.079 TH; origin: Firmenich SA, Geneva, Switzerland

The saline solutions thus obtained were submitted, for evaluation on a blind test, to a panel of expert flavorists, composed of at least ten individuals. The result of this evaluation showed that the solutions containing the compositions B to K were systematically preferred by a majority of flavorists, relative to that of the base composition A. In their opinion, they all possessed an enhanced meaty character, a richer taste and better impact on the mouth than that of the base solution A. This is apparent from the following table which summarizes the evaluations in terms of organoleptic descriptors, relative to the base solution.

TABLE

| Composition | Taste |
|---|---|
| B | more meaty and full, more roasty |
| C | more fatty, more body, more balanced |
| D | more grilled, meaty and rounder |
| E | more fatty and grilled, more crusty |
| F | more fatty and juicy, bloody |
| G | more roasty, round and tallow |
| H | more body, more fatty and meaty |
| I | more roasty, rich and oily |
| J | more fatty, rich, crusty and full, more body |
| K | more grilled, tallow |

Compositions B, D to F and J were particularly liked.

EXAMPLE 14
Meat Type Flavoring Compositions

To a 0.5% NaCl aqueous saline solution there were added the following ingredients, in the proportions indicated, to prepare flavored solutions containing the flavoring compositions A to H.

TABLE

| Ingredient | Flavoring composition (ppm) | | | | | | | |
|---|---|---|---|---|---|---|---|---|
| | A | B | C | D | E | F | G | H |
| Base flavor* | 50 | 50 | 50 | 50 | 50 | 50 | 50 | 50 |
| Compound 1 | — | 0.5 | — | — | — | — | — | — |
| Compound 6 | — | — | 0.5 | — | — | — | — | — |
| Compound 7 | — | — | — | 0.5 | — | — | — | — |
| Compound 11 | — | — | — | — | 0.5 | — | — | — |
| Compound 13 | — | — | — | — | — | 0.5 | — | — |
| Compound 14 | — | — | — | — | — | — | 0.5 | — |
| Compound 18 | — | — | — | — | — | — | — | 0.5 |

*beef broth type, 504.080 TH; origin: Firmenich SA, Switzerland

The saline solutions thus obtained were submitted, for evaluation on a blind test, to a panel of expert flavorists, composed of at least ten individuals. The result of this evaluation showed that the solutions containing the compositions B to H were systematically preferred by a majority of flavorists, relative to that of the base composition A. In their opinion, they all possessed a rounder and more full-bodied character, a richer taste and a better impact on the mouth than that of the base solution. This is apparent from the following table which summarizes the evaluations in terms of organoleptic descriptors, relative to the base solution.

TABLE

| Composition | Taste |
|---|---|
| B | more fatty, oily and full |
| C | more animal, enhanced meaty notes, pork |
| D | animal, tallow, meaty, more impact |
| E | more fatty and roasty, more meaty, copious |
| F | softer and more oily, meaty, copious and fuller |
| G | more roasty, fuller and less tallow |
| H | more meaty, brothy, roasty and full |

The flavorists showed a particular interest in compositions C, F and more especially H.

EXAMPLE 15
Meat Type Flavoring Compositions

To a 0.5% NaCl aqueous saline solution there were added the following ingredients, in the proportions indicated, to prepare flavored solutions containing the flavoring compositions A to G.

TABLE

| Ingredient | Flavoring composition (ppm) | | | | | | |
|---|---|---|---|---|---|---|---|
| | A | B | C | D | E | F | G |
| Base flavor* | 100 | 100 | 100 | 100 | 100 | 100 | 100 |
| Compound 2 | — | 0.5 | — | — | — | — | — |
| Compound 4 | — | — | 0.5 | — | — | — | — |
| Compound 6 | — | — | — | 0.5 | — | — | — |
| Compound 12 | — | — | — | — | 0.5 | — | — |
| Compound 13 | — | — | — | — | — | 0.5 | — |
| Compound 18 | — | — | — | — | — | — | 0.5 |

*savory beef type, 504.081 TH; origin: Firmenich SA, Geneva, Switzerland

The saline solutions thus obtained were submitted, for evaluation on a blind test, to a panel of expert flavorists, composed of at least ten individuals. The result of this evaluation showed that the solutions containing the compositions B to G were systematically preferred by a majority of flavorists, relative to that of the base composition A. In their opinion, they all possessed an enhanced meaty character, a richer and fattier taste and better impact on the mouth than that of the base solution. This is apparent from the following table which summarizes the evaluations in terms of organoleptic descriptors, relative to the base solution.

TABLE

| Composition | Taste |
|---|---|
| B | more meaty and brothy, slightly more fatty, more impact |
| C | richer, less sulphury, fattier and fuller, more impact and better balanced |

TABLE-continued

| Composition | Taste |
|---|---|
| D | more juicy, broth, more full and roasty, more impact |
| E | more meaty, roasty, full, sulphur notes flatened |
| F | more broth, meaty, rich and full, bloody |
| G | more meaty, full, juicy, sulphury |

Compositions C and E were particularly appreciated.

EXAMPLE 16

Flavoring of an Instant Dessert

A "light" instant dessert was prepared with the following ingredients:

| Ingredients | Parts by weight |
|---|---|
| Sugar | 69.13 |
| Dariloid ® QH [1] | 3.00 |
| Sodium pyrophosphate in powder | 1.30 |
| Calcium sulphate dihydrated | 0.70 |
| Salt | 0.40 |
| Food coloring | 0.47 |
| Total | 75.00 |

[1] alginate; origin: Kelco International GmbH, Germany

In an appropriate vessel the above-mentioned ingredients were incorporated into 480 ml of cold milk. The mixture was stirred in an electric mixer during 3 minutes and then poured into dessert cups. The latter were put into the refrigerator for 15 minutes.

At the same time, flavored desserts according to the invention were prepared, by adding to the above-mentioned base dessert, before its placement in the refrigerator, the following ingredients, in the proportions indicated.

| | Flavored dessert (ppm) | | | |
|---|---|---|---|---|
| Ingredient | A | B | C | D |
| Flavor * | 1300 | 1300 | 1300 | 1300 |
| Compound 4 | 0.70 | 0.70 | 0.70 | 0.40 |
| Valine | — | 0.35 | 0.70 | 0.80 |

* condensed milk type, 504.133 CE; origin: Firmenich SA, Geneva, Switzerland

These four desserts were then compared on a blind test, by a panel of expert flavorists, with the base dessert flavored by means of 1300 ppm of the condensed milk flavor mentioned above. The flavorists indicated an unanimous preference for the flavored desserts A to D, the taste of which was judged more buttery and full, as is apparent from the following table which summarizes the evaluations in terms of organoleptic descriptors, relative to the base dessert containing only the flavor.

TABLE

| Dessert | Taste |
|---|---|
| A | less burnt, creamier, fermented, rum and vanilla, volatile note more full-bodied, less caramel and more butter |
| B | more vanillin, caramel and buttery |
| C | softer and fuller, more creamy and buttery, vanilla |
| D | more sugared and buttery, melted butter, slightly hazelnut |

EXAMPLE 17

Vegetable Type Flavoring Compositions

To a 0.5% NaCl aqueous saline solution there were added the following ingredients, in the proportions indicated, to prepare flavored solutions containing the flavoring compositions A to E.

TABLE

| | Flavoring composition (ppm) | | | | |
|---|---|---|---|---|---|
| Ingredient | A | B | C | D | E |
| Base flavor * | 200 | 200 | 200 | 200 | 200 |
| Compound 6 | — | 0.6 | — | — | — |
| Compound 7 | — | — | 0.6 | — | — |
| Compound 13 | — | — | — | 0.6 | — |
| Compound 14 | — | — | — | — | 0.6 |

* asparagus type, 503.484 T; origin: Firmenich SA, Geneva, Switzerland

The solutions thus obtained were submitted, for evaluation on a blind test, to a panel of expert flavorists, composed of at least ten individuals.

In the opinion of the flavorists, the solutions containing the compositions B to D all possessed an enhanced vegetable character and more typical of asparagus than that of the solution containing composition A, and the solution of composition E in particular had far more impact and improved mouthfeel.

Similar tests were carried with celery type compositions, prepared with the following ingredients:

TABLE

| | Flavoring composition (ppm) | | | | | | | | | |
|---|---|---|---|---|---|---|---|---|---|---|
| Ingredient | A | B | C | D | E | F | G | H | I | J |
| Base flavor* | 200 | 200 | 200 | 200 | 200 | 200 | 200 | 200 | 200 | 200 |
| Compound 2 | — | 0.6 | — | — | — | — | — | | | — |
| Compound 3 | — | — | 0.6 | — | — | — | — | | | — |
| Compound 6 | — | — | — | 0.6 | — | — | — | | | — |
| Compound 7 | — | — | — | — | 0.6 | — | — | | | — |
| Compound 9 | — | — | — | — | — | 0.6 | — | | | — |
| Compound 11 | — | — | — | — | — | — | 0.6 | | | — |
| Compound 12 | — | — | — | — | — | — | — | 0.6 | | — |

TABLE-continued

| | Flavoring composition (ppm) | | | | | | | | | |
|---|---|---|---|---|---|---|---|---|---|---|
| Ingredient | A | B | C | D | E | F | G | H | I | J |
| Compound 13 | — | — | — | — | — | — | — | — | 0.6 | — |
| Compound 14 | — | — | — | — | — | — | — | — | — | 0.6 |

*celery type, 503.071 T; origin: Firmenich SA, Geneva, Switzerland

Once more, the flavorists showed a preference for compositions B to J relative to composition A, with a particular preference for composition C the taste of which had become stronger, more meaty, terpenic and woody.

EXAMPLE 18
Flavoring of Orange Juice and of Orange Type Flavoring Compositions To a base orange juice, obtained by simple dilution of a commercial origin concentrate, there were added the following ingredients, in the proportions indicated, to prepare flavored samples.

TABLE

| | Flavored sample (ppm) | |
|---|---|---|
| Ingredient | A | B |
| Compound 5 | 1.0 | — |
| Compound 11 | — | 0.5 |

The orange juices thus obtained were then submitted, together with the base juice, to a panel of expert flavorists, for a blind evaluation.

According to the flavorists, samples A and B had a sweeter and fuller taste, less metallic than that of the base juice, sample A in particular also having more body. These effects were observed through a whole range of concentrations tested.

On the other hand, the addition of 1 ppm of compound 11 to a finished flavor of the orange type (705 169.01 A; origin: Firmenich SA, Geneva, Switzerland) provided an improvement in the juicy character, in the fruity, sweet note of the flavor and enhanced its volume and impact in the mouth. In the flavorists' opinion, the compound of the invention produced a particularly marked effect on the aldehydic notes of the flavor, softening them, and enhanced in a much appreciated manner the fruity, citronella characters imparted by such compounds as citral and citronellal.

EXAMPLE 19
Flavoring of Bouillons

A base meat bouillon was prepared by means of a Star Sapore Lieve (origin: Star SpA, Brianza, Italy) type cube. To this base bouillon there was added, on the one hand, 0.5 ppm of 3-methyl-2-oxo-pentanoic acid (compound 5) to prepare a novel bouillon A and, on the other hand, the same amount of this compound and 1.5 ppm of isoleucine to prepare a new broth B.

The three bouillons were then evaluated on a blind test by a panel of expert flavorists, who were asked to indicate their preference from the point of view of the organoleptic properties of the evaluated products.

A majority of flavorists preferred bouillons A and B to the base bouillon, the taste of bouillon A having been judged more meaty, full and umami, and that of bouillon B having a more pronounced meat character, with more balanced fatty notes.

Similar tests were carried out with a vegetable type base soup, prepared by means of a Knorr® Gusto Vegetale cube (origin: CPC Italia SpA, Milan, Italy). To this base soup there was added 1 ppm of 3-mercapto-2-oxo-propanoic acid (compound 18) to prepare a novel soup C. In parallel, a new bouillon D was prepared by adding to the base bouillon the same amount of this compound and 2 ppm of cysteine (in the form of its salt with HCl).

Upon the evaluation on a blind test of bouillons C and D and the base bouillon, a clear preference for the first two was ascertained, bouillon D being the most appreciated.

EXAMPLE 20

Flavoring of "Cantadou" Type Cheeses

Cheeses flavored according to the invention were prepared by adding to a base cheese of the "Cantadou-ail, fines herbes" (garlic, fine herbs; origin: Migros, Switzerland) the following ingredients, in the proportions indicated.

| | Flavored cheese (ppm) | | | |
|---|---|---|---|---|
| Ingredient | A | B | C | D |
| Compound 18 | 0.80 | 0.80 | 0.80 | 0.80 |
| Cysteine | — | 0.40 | 0.80 | 1.60 |

These four cheeses were then compared to the base cheese by a panel of expert flavorists, on a blind test. The effect of adding the above-mentioned ingredients springs out in a clear manner from the table hereinafter, which summarizes the evolutions in terms of organoleptic descriptors, relative to the base cheese.

TABLE

| Cheese | Taste |
|---|---|
| A | more acidic, more fatty, garlic note slightly covered |
| B | more fatty, soft, creamy, longer lasting in the mouth |
| C | almost mayonnaise, creamy, more savoury, glutamate |
| D | mayonnaise, almost cooked-meaty, heavy, herbal |

This effect of enhancing the creaminess of the cheese, to a point of becoming almost oily, was also observed with two other types of "Cantadou" on which similar tests were carried out, the results of which are summarized hereinafter.

Thus, to a "Cantadou-curry" (origin: Migros) there were added the following ingredients:

| | Flavored cheese (ppm) | | | |
|---|---|---|---|---|
| Ingredient | F | F | G | H |
| Compound 18 | 0.80 | 0.80 | 0.80 | 0.80 |
| Cysteine | — | 0.40 | 0.80 | 1.60 |

Upon evaluation of the four novel cheeses, relative to the base cheese, the following comments were made:

TABLE

| Cheese | Taste |
|---|---|
| E | less chalky, more acidic, more mouthfeel, more curry and slightly less fenugreek |
| F | less acidic, more creamy, more mouthfeel |
| G | more savoury, more fatty-creamy, enhanced caramel and cumin note, more mouthfeel |
| H | pasty, very heavy and buttery, curry note slightly crushed |

Finally, to a "Cantadou-raifort" (horseradish; origin: Migros), the following ingredients were added:

| | Flavored cheese (ppm) | | | |
|---|---|---|---|---|
| Ingredient | I | J | K | L |
| Compound 18 | 0.80 | 0.80 | 0.80 | 0.80 |
| Cysteine | — | 0.40 | 0.80 | 1.60 |

When these four novel cheeses were evaluated, relative to the base cheese, the following comments were expressed:

TABLE

| Cheese | Taste |
|---|---|
| I | stronger, more piquant, more acidic |
| J | even more piquant than I, creamier, slightly melted cheese |
| K | piquant tonality even more exhalted and covering the creamy character, slightly sulphury |
| L | more piquant, attenuated cheese connotation, slightly sulphury |

In the latter case, the addition of the above-mentioned ingredients engenders an increase in the piquant/spicy character of the base cheese, together with an enhanced mouthfeel, but which is not so apparent as in the other two types of "Cantadou" mentioned higher up. In fact, the piquant and fresh notes of the horseradish are those which are reinforced in this case.

EXAMPLE 21

Cereal Type Flavoring Compositions

The following ingredients were added to spring water, in the proportions indicated, to prepare flavored solutions containing the flavoring compositions A to H.

TABLE

| | Flavoring composition (ppm) | | | | | | | |
|---|---|---|---|---|---|---|---|---|
| Ingredient | A | B | C | D | E | F | G | H |
| Base flavor* | 100 | 100 | 100 | 100 | 100 | 100 | 100 | 100 |
| Compound 3 | — | 1.0 | — | — | — | — | — | — |
| Compound 4 | — | — | 1.0 | — | — | — | — | — |
| Compound 5 | — | — | — | 1.0 | — | — | — | — |
| Compound 6 | — | — | — | — | 1.0 | — | — | — |
| Compound 11 | — | — | — | — | — | 1.0 | — | — |
| Compound 12 | — | — | — | — | — | — | 1.0 | — |
| Compound 13 | — | — | — | — | — | — | — | 1.0 |

*cereal type, 502.749 A; origin: Firmenich SA, Geneva, Switzerland

The solutions thus obtained were then submitted for evaluation on a blind test to a panel of expert flavorists, who had to indicate their preferences from the point of view of the organoleptic qualities of these solutions. The results of this evaluation brought out the modifications in the organoleptic profile of the base flavor, in particular in the case of compositions D, E, F, G and H, the solutions of which had an enhanced chocolate character and a better impact in the mouth.

EXAMPLE 22

Honey Type Flavoring Compositions

To a 10% sugar solution there were added the following ingredients, in the proportions indicated.

TABLE

| | Flavoring composition (ppm) | | | | | | | | |
|---|---|---|---|---|---|---|---|---|---|
| Ingredient | A | B | C | D | E | F | G | H | I |
| Base flavor* | 100 | 100 | 100 | 100 | 100 | 100 | 100 | 100 | 100 |
| Compound 3 | — | 1.0 | — | — | — | — | — | — | — |
| Compound 5 | — | — | 1.0 | — | — | — | — | — | — |
| Compound 6 | — | — | — | 1.0 | — | — | — | — | — |
| Compound 7 | — | — | — | — | 1.0 | — | — | — | — |
| Compound 11 | — | — | — | — | — | 1.0 | — | — | — |
| Compound 12 | — | — | — | — | — | — | 1.0 | — | — |
| Compound 13 | — | — | — | — | — | — | — | 1.0 | — |
| Compound 18 | — | — | — | — | — | — | — | — | 1.0 |

*honey type, 503.666 A; origin: Firmenich SA, Geneva, Switzerland

When the solutions thus obtained were submitted for evaluation on a blind test to a panel of expert flavorists, remarkable changes in the profile of the base flavor were observed. Thus, solutions B, D and F now possessed a taste wherein the caramel type character was distinctly reinforced relative to that of the base flavor, whereas compositions E, G and H had an increased floral character and their tonality reminiscent of the typical taste of phenylacetate had also become stronger.

EXAMPLE 23

Alcoholic Type Flavoring Compositions

The following ingredients were added to a 10% sugar solution, in the proportions indicated.

TABLE

| Ingredient | Flavoring composition (ppm) | | | | | | | |
|---|---|---|---|---|---|---|---|---|
| | A | B | C | D | E | F | G | H |
| Base flavor* | 200 | 200 | 200 | 200 | 200 | 200 | 200 | 200 |
| Compound 2 | — | 1.0 | — | — | — | — | — | — |
| Compound 3 | — | — | 1.0 | — | — | — | — | — |
| Compound 7 | — | — | — | 1.0 | — | — | — | — |
| Compound 10 | — | — | — | — | 1.0 | — | — | — |
| Compound 11 | — | — | — | — | — | 1.0 | — | — |
| Compound 14 | — | — | — | — | — | — | 1.0 | — |
| Compound 18 | — | — | — | — | — | — | — | 1.0 |

*rum type, 53.305 T; origin: Firmenich SA, Geneva, Switzerland

When these compositions were evaluated on a blind test, the flavorists showed a preference for compositions B to H relative to composition A. They indicated further that when using a base flavor of the alcoholic drink type such as mentioned above, two types of modifications could be observed in the profile of this flavor. For example, compositions C to E and G, H had a more fermented character, while compositions B and F were more phenolic than composition A.

EXAMPLE 24

Flavoring of Fruit Juices

To a blackcurrant juice, obtained by simple dilution in spring water of a concentrated juice of commercial origin, there were added 5 ppm of 2-oxo-butanoic acid (compound 3). Upon the blind evaluation of the thus flavored juice, relative to the solution of commercial juice, the panel of expert flavorists expressed a preference for the former, the taste of which had a more cooked tonality, slightly jam like and liquorice. Similar tests with a raspberry juice, to which however 5 ppm of 3-methyl-2-oxo-pentanoic acid (compound 5) and 5 ppm of isoleucine had been added, showed that the juice flavored according to the invention had a far more pronounced raspberry tonality.

EXAMPLE 25

Vanillin Flavored Compositions

A base aqueous solution containing 10 ppm by weight of vanillin was prepared. With this solution, novel solutions were obtained by adding thereto 1 ppm of compound 4 (solution A) and, respectively 1 ppm of compound 7 (solution B). Solutions A and B were then compared on a blind test with the base one by a panel of expert flavorists, who preferred solutions A and B and qualified their organoleptic character as follows, relative to that of the base solution:

TABLE

| Solution | Taste |
|---|---|
| A | sweeter, creamier, enhanced mouthfeel, more praline like, with slightlier fatty character |
| B | slightly more powdery, cardboard |

Solution A was better appreciated. In addition, when the sodium salt of compound 4 was added, at a rate of 2 ppm, to the vanillin, similar organoleptic effects to those observed with solution A were noted.

EXAMPLE 26

Flavoring of Chocolate Drinks

Chocolate drinks were prepared by adding 20 g of a chocolate powder of the Nesquick® type (Nestle) to 200 ml of skimmed milk.

To this base chocolate drink were then added the following ingredients, in the proportions indicated.

| Ingredient | Flavored drink (ppm) | | | |
|---|---|---|---|---|
| | A | B | C | D |
| Flavor * | 1500 | 1500 | 1500 | 1500 |
| Compound 4 | 1.2 | 1.2 | — | — |
| Valine | — | 1.5 | — | — |
| Compound 5 | — | — | 1.2 | 1.2 |
| Isoleucine | — | — | — | 1.5 |

* Firanova ® chocolate type, 570.090 TPL 0404; origin: Firmenich SA, Geneva, Switzerland These four drinks were then compared on a blind test by a panel of expert flavorists, with the base drink flavored by means of 1500 ppm of the chocolate flavor mentioned above. The flavorists indicated an unanimous preference for the flavored drinks A to D, the taste of which was judged to be creamier and more full-bodied, as is apparent from the table hereinafter, which summarizes the evaluations in terms of organoleptic descriptors, relative to the base drink containing only the flavor.

TABLE E

| Drink | Taste |
|---|---|
| A | richer, creamier, softer in the milky notes |
| B | as A, but with an even enhanced dark chocolate character |
| C | softer milky notes and increased creamy character |
| D | again, a reinforced dark chocolate type taste relative to C |

EXAMPLE 27

Flavoring of Coffee Drinks

Drinks having a coffee taste were prepared by adding 12.5 g of a powder coffee of the Nestlé® Cappucino type to 150 ml of non-boiling hot water. To this base coffee drink there were then added the following ingredients, in the proportions indicated.

| | Flavored drink (ppm) | | | |
|---|---|---|---|---|
| Ingredient | A | B | C | D |
| Flavor * | 1500 | 1500 | 1500 | 1500 |
| Compound 4 | 1.5 | 1.5 | — | — |
| Valine | — | 1.7 | — | — |
| Compound 5 | — | — | 1.5 | 1.5 |
| Isoleucine | — | — | — | 1.7 |

* Firanova ® cappucino type, 570.092 TPL 0451; origin Firmenich SA, Geneva, Switzerland These four drinks were then compared on a blind test by a panel of expert flavorists, with the base drink flavored by means of 1500 ppm of the coffee flavor above-mentioned. The flavorists indicated an unanimous preference for the flavored drinks A to D, the taste of which was judged to be smoother and giving a more persistent impression, as is apparent from the table hereinafter, which summarizes the evaluations in terms of organoleptic descriptors and relative to the base drink containing only the flavor.

TABLE

| Drink | Taste |
|---|---|
| A | richer, creamier and smoother, longer lasting effect in the mouth |
| B | as A, but with enhanced black coffee character |
| C | as A |
| D | as B |

EXAMPLE 28
Chicken Type Flavoring Composition

To a 0.5% NaCl aqueous saline solution there were added the following ingredients, in the relative proportions indicated, to prepare a flavored base solution containing the flavoring composition formed of these ingredients.

| Ingredients | Parts by weight (ppm) |
|---|---|
| Isoeugenol | 1.0000 |
| p-Vinylguaiacol | 0.1000 |
| 2-Acetylpyrazine | 0.0050 |
| 2,3,5-Trimethylpyrazine | 0.0200 |
| 3-Ethyl-2-methylpyrazine | 0.2500 |
| Dimethyl sulphide | 2.0000 |
| Dimethyl disulphide | 0.5000 |
| Methylpropyl disulphide | 0.0015 |
| Dimethyl trisulphide | 0.0100 |
| 2-Methylthiophenol | 2.0000 |
| 2-Octenal | 0.0050 |
| 2,4-Nonadienal | 0.0050 |
| 2,4-Undecadienal | 0.0050 |
| 2,4-Dodecadienal | 0.0100 |

To this base solution, which had a chicken type aroma note, there was added, at a rate of 0.5 ppm, one of the compounds 3, 4, 5 or 10, to prepare novel flavored solutions. When the latter were tasted by a panel of expert flavorists and compared to the base solution, it became apparent that they possessed a chicken taste of enhanced fullness and strength, relative to the base solution. The flavorists also indicated that they perceived the taste of these novel solutions for a far longer period of time.

Moreover, similar effects were observed when the properties of a chicken type finished flavor (504 303 TH; origin : Firmenich SA, Geneva, Switzerland) were organoleptically modified by the addition, at a rate of 0.05% by weight, of one of the above-mentioned acids, or yet of compound 18.

EXAMPLE 29
Beef Type Meat Flavoring Compositions

To a 0.5% NaCl aqueous saline solution there were added the following ingredients, in the relative proportions indicated, to prepare a flavored base solution containing the flavoring composition formed of these ingredients.

| Ingredients | Parts by weight (ppm) |
|---|---|
| Methyl 2-furanecarboxylate | 1.00 |
| Furaneol ® | 0.8030 |
| 2-Ethyl-3,5-dimethylpyrazine | 0.01 |
| 10-Undecenoic acid redist. | 0.60 |
| Undecanoic acid | 0.165 |
| Methional | 0.035 |
| 2-Acetylpyrazine | 0.020 |
| 2-Ethyl-4-hydroxy-3-methyl-5(2H)-furanone | 0.010 |
| Iso-decanoic acid | 0.30 |
| Iso-nonanoic acid | 0.15 |
| 10-Undecenoic acid | 0.50 |
| 2,3,5-Trimethylpyrazine | 0.06 |
| 2,3-Diethyl-5-methylpyrazine | 0.03 |

The addition of 5 ppm of compound 3, 5 or 18 to this base solution made it possible to quite enhance the meaty and grilled character of the base composition, also giving it an increased impact in the mouth.

The same effect was observed upon addition of any one of the above-mentioned acids to a finished meat type flavor (573030 P; origin: Firmenich SA, Geneva, Switzerland).

To this end, the base flavor (1000 ppm) and the novel flavor obtained by addition of 5 ppm of acid were tasted in saline solutions such as those previously mentioned, on a blind test.

EXAMPLE 30
Tomato Type Flavoring Composition

To a 0.5% NaCl aqueous saline solution there were added the following ingredients, in the relative proportions indicated, to prepare a flavored base solution containing the flavoring composition formed of these ingredients.

| Ingredients | Parts by weight (ppm) |
|---|---|
| Octanoic acid | 2.000 |
| 5-Dodecanolide | 0.300 |
| Methional | 0.700 |
| 5-Methylfurfural | 6.000 |
| Vanilline | 0.100 |
| Eugenol | 0.400 |
| Ortho-cresol | 0.020 |
| Guaiacol | 0.030 |
| Dimethyl sulphide | 25.000 |
| Methylmercaptan | 0.003 |

With this flavored base solution, 3 novel flavored solutions were prepared by adding thereto 5 ppm of compound 3 (solution A), 5 ppm of compound 4 (solution B) and 5 ppm of compound 6 (solution C).

The four solutions were then evaluated on a blind test by a panel of expert flavorists. The latter unanimously preferred solutions A, B and C to the base solution, with regard to which solution A was judged to have a stronger and fuller taste, also juicier, solution B a more pronounced cooked character and solution C was judged to be far juicier and richer in "fleshy" character. Similar effects were observed when the above-mentioned acids were added, at a rate of 5% by weight to a tomato type finished flavor (502022 A; origin: Firmenich SA, Geneva, Switzerland).

EXAMPLE 31
Tomato Type Flavoring Composition

To a 0.5% NaCl aqueous saline solution there were added the following ingredients, in the relative proportions indicated, to prepare a flavored base solution containing the flavoring composition formed of these ingredients.

| Ingredients | Parts by weight (ppm) |
| --- | --- |
| Butyric acid | 1.00 |
| Isovalerianic acid | 1.50 |
| Octanoic acid | 0.60 |
| Methional | 1.30 |
| Dimethyl sulphide | 40.00 |
| Methylmercaptan | 0.03 |
| 3,4-Dimethyl-1,2-cyclopentanedione | 0.10 |
| Fugenol | 0.40 |
| 5-Methylfurfural | 6.00 |
| Isobutyl acetate | 0.90 |
| Hexanal | 1.20 |
| 2-Hexenal | 0.50 |
| Linalyl benzoate | 3.00 |
| Linalyl caproate | 8.00 |
| Hexyl 2-butenoate | 0.40 |

When 5 ppm of compound 5 were added to this base solution, there was obtained a novel flavored solution, the tomato taste of which had far greater impact in the mouth and was more full-bodied than that of the base solution. This compound brought a similar modification to the taste of a finished flavor (tomato 502224 A; origin: Firmenich SA, Geneva, Switzerland) into which said compound had been incorporated at a rate of 5% by weight.

EXAMPLE 32
Cheese Type Flavoring Compositions

To a 0.5% NaCl aqueous saline solution there were added the following ingredients, in the relative proportions indicated, to prepare a flavored base solution containing the flavoring composition formed of these ingredients.

| Ingredients | Parts by weight (ppm) |
| --- | --- |
| Methional | 0.45 |
| Dimethyl sufide | 0.45 |
| Methyl 3-(methylthio)-propanoate | 1.15 |
| 2-Heptanone | 0.75 |
| 2-Nonanone | 1.50 |
| δ-Decalactone | 0.75 |
| δ-Dodecalactone | 1.50 |
| Propanoic acid | 27.75 |
| Butyric acid | 30.00 |
| Isobutyric acid | 4.50 |
| Pentanoic acid | 7.50 |
| Isovalerianic acid | 2.25 |
| Caproic acid | 12.00 |
| Caprylic acid | 12.00 |
| Capric acid | 4.50 |

When 0.5 ppm of one of compounds 3, 4, 5, 10 or 18 were added to this base solution, an improvement in the taste and flavor of the solution was observed, the latter having become stronger and fuller, with a longer lasting effect in the mouth.

EXAMPLE 33
Celery Type Flavoring Composition

To a 0.5% NaCl aqueous saline solution there were added the following ingredients, in the relative proportions indicated, to prepare a flavored base solution containing the flavoring composition formed of these ingredients.

| Ingredients | Parts by weight (ppm) |
| --- | --- |
| 2,6-Nonadienol | 0.0001 |
| cis-4-Hexenol | 4.0000 |
| Hexanal | 1.0000 |
| trans-2-Hexenal | 1.0000 |
| 3-Propylidene phthalide | 12.0000 |
| 3-n-Butylidene phthalide | 0.6000 |
| Carrot essential oil | 0.8000 |
| Celery essential oil | 50.0000 |
| Juniper essential oil | 5.0000 |
| Lovage leaves essential oil | 6.0000 |

The addition to this base composition of 0.5 ppm of one of compounds 3, 4, 5 or 10 provided novel flavoring compositions having a far richer and fuller celery taste.

EXAMPLE 34
Chocolate Type Flavoring Compositions

The following ingredients were added to spring water, in the proportions indicated, to prepare a flavored base solution containing the flavoring composition composed of these ingredients.

| Ingredients | % by weight |
| --- | --- |
| Butyric acid | 1.0 |
| Isobutyric acid | 1.0 |
| 2-Methylbutyric acid | 1.0 |
| Isovalerianic acid | 1.0 |
| 2-Methyl-caproic acid | 1.0 |
| Isobutyric aldehyde | 2.0 |
| Isovalerianic aldehyde | 0.5 |
| 5-Methylfurfural | 2.5 |
| Furfuryl alcohol | 3.0 |

The addition to this base solution of compound 4, or of its sodium salt, at a rate of 3 ppm, reinforces the buttery and creamy character of the composition and renders it richer, while softening the aldehydic notes.

EXAMPLE 35
Caramel Milk Type Flavoring Compositions

The following ingredients were added to spring water, in the proportions indicated, to prepare a flavored base solution containing the flavoring composition composed of these ingredients.

| Ingredients | % by weight |
| --- | --- |
| Mixture of octanoic and decanoic acids | 7.5 |
| Vanilline | 7.5 |
| δ-Decalactone | 3.0 |
| Methyl 2-furanecarboxylate | 3.0 |
| Acetoine | 2.5 |
| Furaneol ® | 2.0 |

The addition of 4 ppm of compound 4 to this solution enhances the caramel, fudge notes of the composition, as well as the milky notes, and brings to it increased sweetness and creaminess. Furthermore, the caramel taste of this novel composition is distinctly longer lasting in the mouth.

The same type of organoleptic effect was observed when adding the same compound to a finished caramel milk type flavor (502625 A; origin: Firmenich SA, Geneva, Switzerland).

EXAMPLE 36
Flavoring Compositions of Type Cassis Sweetened With Aspartame®

A spring water, sweetened by means of 0.025% by weight of Aspartame® and containing 0.15% by weight of citric acid, was flavored with 50 ppm of a blackcurrant type flavor composed of the following ingredients.

| Ingredients | Parts by weight |
| --- | --- |
| 3-Hexen-1-ol | 5 |
| Buchu oil | 2 |
| α-Ionone | 1 |
| 8-Mercapto-3-p-menthanone * | 15 |
| Eugenol | 2 |
| Dimethyl sulphide | 30 |
| Maltol | 50 |
| p-Hydroxyphenyl-2-butanone | 30 |
| Ethyl butyrate | 75 |
| Propyleneglycol | q.s. |
| Total | 1000 |

* at 1% in propyleneglycol; origin: Firmenich SA, Geneva Switzerland

Compounds 4, 13 and 17 were added to this base solution, at a rate of 5 ppm, to prepare three novel flavored solutions.

A panel of expert flavorists then evaluated these solutions on a blind test, relative to the base solution. In the flavorists' opinion, the three novel solutions were all preferred for their far juicier and fruitier blackcurrant note, relative to that of the base solution.

The same effects were observed when the above-mentioned acids were added at a rate of 10 ppm by weight.

Similar evaluations were carried out, in aqueous solutions sweetened by means of 0.025% by weight of Aspartame® and containing 0.15% of citric acid, with a finished base flavor of the blackcurrant type (50 ppm; 502009 A; origin: Firmenich SA, Geneva, Switzerland), and with a mixture of the latter with 5 ppm of compound 13 (flavor A), 5 ppm of compound 17 (flavor B) or 5 ppm of compound 4 or its sodium salt (flavor C). According to the flavorists, flavors A, B and C all possessed a fruitier, juicier and jam like taste, also more full-bodied and sweeter, than the base flavor. They were all preferred to the latter.

EXAMPLE 37
Raspberry Type Flavoring Compositions Sweetened with Aspartame®

A spring water, sweetened by means of 0.025% by weight of Aspartame® and containing 0.15% by weight of citric acid, was flavored with 100 ppm of a raspberry type flavor composed of the following ingredients.

| Ingredients | Parts by weight |
| --- | --- |
| 3-Hexen-1-ol | 15 |
| Ethyl acetate | 75 |
| α-Ionone | 1 |
| Isobutyl acetate | 20 |
| Geraniol | 10 |
| p-Hydroxyphenyl-2-butanone | 75 |
| Propyleneglycol | q.s. |
| Total | 1000 |

Compounds 4, 13 and 17 were added to this base solution, at a rate of 5 ppm by weight, to prepare three novel flavored solutions.

A panel of expert flavorists then evaluated these solutions on a blind test, relative to the base solution. The flavorists preferred the three novel solutions which were judged to have an enhanced fruity and jam-like note.

The same effects were observed when the above-mentioned acids were added at a rate of 10 ppm by weight.

Similar evaluations were carried out, in aqueous solutions sweetened by means of 0.025% by weight of Aspartame® and containing 0.15% of citric acid, with a finished base flavor of the raspberry type (100 ppm; 52354/A; origin: Firmenich SA, Geneva, Switzerland), and with a mixture of the latter with 5 ppm of compound 13 (flavor A), 5 ppm of compound 17 (flavor B) or 5 ppm of compound 4 or its sodium salt (flavor C). According to the flavorists, flavors A, B and C all possessed a sweeter and more jam like taste, also more full-bodied, than the base flavor and they were all preferred to the latter.

EXAMPLE 38
Orange Type Flavoring Compositions

A spring water, sweetened by means of 0.025% by weight of Aspartame® and containing 0.15% by weight of citric acid, was flavored by means of 100 ppm of an orange type flavor composed of the following ingredients:

| Ingredients | Parts by weight |
| --- | --- |
| Acetic aldehyde | 30 |
| Hexanol | 3 |
| Dodecanol | 6 |
| Ethyl butyrate | 15 |
| 10% * Decanal | 5 |
| Orange terpenes mixture [1] | q.s. |
| Total | 1000 |

* in an orange terpenes mixture
[1] origin: Firmenich SA, Geneva, Switzerland

Compounds 4, 13 and 17 were added to this base solution at a rate of 5 ppm by weight each, to prepare three novel solutions which were evaluated on a blind test, together with the base solution, by a panel of expert flavorists. In the opinion of the latter, the three novel solutions all had a far juicier taste than the base solution.

EXAMPLE 39
Flavoring of Cola Light Type Beverages

To a base drink of the Cola "light" type, i.e. sugar lightened, of commercial origin, containing artificial sweeteners (35.6 mg of Sodium cyclamate, 12.5 mg of Acesulfam® K and 12 mg of Aspartame®, per 100 ml of drink), there were added respectively 0.05 ppm of compound 5 (drink A) and 0.05 ppm of compound 6 (drink B).

Drinks A and B, as well as the base drink, were then compared on a blind test by a panel of expert flavorists. The latter indicated a particular preference for drink B, which taste was judged stronger in the sugar note, which lasted far longer in the mouth, relative to the base solution. Similar effects were moreover observed by adding a proportion of 0.25 ppm by weight of compound 6.

As to drink A, it was also preferred to the base solution, its taste having more volume, being sweeter and more lemon-lime than that of the base drink. The same was observed when compound 5 was added to the latter in a proportion of 0.5 ppm.

EXAMPLE 40
Flavoring Composition

A flavoring composition according to the invention was prepared by admixing in equivalent molar proportions 4-methyl-2-oxo-pentanoic acid (compound 6), 3-methyl-2-oxo-pentanoic acid (compound 5), 2-oxo-3- phenylpropanoic acid (compound 11), 4-(methylthio)-2-oxo-butanoic acid (compound 14) and 2-oxo-1H-indole-3-propanoic acid (compound 13).

Upon adding this flavoring composition, at a rate of 3 ppm by weight, to a Cola "light" type drink such as cited in the previous example, a novel drink was obtained, which possessed a sweeter and more pleasant taste than the original drink, the characteristic aftertaste of the artificial sweeteners having been distinctly abated.

Other tests were also carried to evaluate the organoleptic effect of the same flavoring composition upon cheese and butter type flavors. To this end, there were added to a 0.5% of NaCl saline solution 150 ppm by weight of a cheese type flavor (504 132 TH; origin: Firmenich SA, Geneva, Switzerland). To this flavored base solution there was then added 1 ppm by weight of the flavoring composition cited above. The novel solution thus obtained, as well as the base solution, were subsequently evaluated on a blind test by a panel of expert flavorists. The result of this evaluation showed a unanimous preference for the novel solution and the flavorists indicated that the creamy character of the latter had been clearly enhanced relative to that of the base solution, the rind type notes having also been somewhat toned down.

Upon similar tests with a butter type flavor (504 131 TH; origin: Firmenich SA, Geneva, Switzerland), added at a rate of 50 ppm by weight, it was also ascertained that the flavoring composition of the invention (1 ppm) improved the taste of said flavor, imparting to it an enhanced creamy and buttery character.

EXAMPLE 41
Tea Type Flavoring Compositions

A tea tasting base flavor (502 911 T; 40 ppm by weight; origin: Firmenich SA, Geneva, Switzerland) was added to spring water to obtain a flavored base solution. When there were added to this base solution 2 ppm by weight of compound 19, a novel solution was obtained having an enhanced straw like, dry leaves character.

On the other hand, compound 20, added in the same proportion, brings to the base flavor a stronger black tea type note and reinforces the fullness of the composition and its slightly fruity herbaceous note.

EXAMPLE 42
Sugar Type Flavoring Compositions

To a base flavor of the type intended to mimic the taste of sugar (503 407 B origin: Firmenich SA, Geneva, Switzerland) there was added a proportion of 0.8% by weight of compound 4 or its sodium salt. The novel composition thus obtained was then evaluated on a blind test by a panel of expert flavorists. According to the latter, the sugar taste of the novel composition was far richer, with a distinctly enhanced molasses and caramel character relative to that of the base flavor.

This enriching effect on the sugar, molasses and caramel note could likewise be observed when the same compound 4 was added to a mixture of Furaneol® (12% by weight), vanillin (5% by weight) and maltol (2% by weight).

What is claimed is:

1. A method to improve, enhance or modify gustative impressions related to texture, volume or fullness, as perceived upon tasting, of a flavoring composition or a food product selected from the group consisting of light products having a low fat or sugar content, meat or meat-flavored products, bouillons, vegetable or vegetable-flavored products, fruit-juices, lemonades, and orange-flavored products, which method comprises adding to said composition or product a flavor and/or taste perceptible amount of one or more active ingredients selected from the group consisting of (a) the α-keto acids glyoxylic, 3-methyl-2-oxo-butanoic, 3-methyl-2-oxo-pentanoic, 4-methyl-2-oxo-pentanoic, 3-hydroxy-2-oxo-propanoic, oxalacetic, 2-oxo-glutaric, 2-oxo-3-phenyl-propanoic, 3-(4-hydroxyphenyl)-2-oxo-propanoic, 2-oxo-1H-indole-3-propanoic, 2-oxo-1H-imidazole-4-propanoic, 4-methylthio-2-oxo-butanoic, 3-mercapto-2-oxo-propanoic, 3-hydroxy-2-oxo-butanoic, 6-amino-2-oxo-hexanoic and 5-guanidino-2-oxo-pentanoic acid, and (b) the edible salts of the said α-keto acids, or a mixture of at least one of the compounds specified under (a) and (b) with the corresponding amino acid or acids.

2. The method according to claim 1, characterized in that said active ingredient is formed of one or more of said α-keto acids or their edible salts, in combination with one or several amino acids selected from the group consisting of 2-amino-butanoic acid, α-alanine, glycine, norvaline, valine, aspartic acid, norleucine, leucine, isoleucine, serine, threonine, glutamic acid, phenylalanine, tyrosine, cysteine, methionine, lysine, tryptophane, histidine, arginine, asparagine, glutamine, cystine, citrulline, theanine, γ-methylene-glutamic acid and their alkaline metal salts.

3. The method according to claim 2, characterized in that the amino acid or its salt is present in a weight proportion of between about 0.5 and 2 times that of the α-keto acid.

4. The method according to claim 1, characterized in that said active ingredient is present in a proportion comprised between about 0.01 and 10% by weight, relative to the weight of the composition.

5. The method according to claim 1, wherein said light product is a product containing an artificial sweetener.

6. The method according to claim 1, wherein said light product is an instant dessert, a butter product, a margarine, a yoghurt, a milk product, a cola based drink, a tea, a lemonade or a fruit juice.

7. The method according to claim 6, wherein said fruit-juice is an orange, blackcurrant or raspberry juice.

8. The method according to claim 1, wherein the volume and fullness of fatty, roasted, chicken or beef flavor notes of a meat or a meat-flavored product is enhanced, improved or modified.

9. The method according to claim 8, wherein the α-keto acid is selected from the group consisting of 2-oxo-butanoic, oxalacetic, 3-methyl-2-oxo-butanoic, 3-methyl-2-oxo-pentanoic, 2-oxo-glutaric and 3-mercapto-2-oxo-propanoic acid.

10. The method according to claim 9, which further comprises adding one or several compounds selected from the group consisting of isoeugenol, 2-propylphenol, p-vinylguaiacol, 2-acetylpyrazine, 2-ethyl-3,5-dimethylpyrazine, 2,3,5-trimethylpyrazine, 2,3-diethyl-5-methylpyrazine, 3-ethyl-2-methylpyrazine, dimethyl sulfide, dimethyl disulfide, dimethyl trisulfide, methylpropyl disulfide, 2-methylthiophenol, methional (3-methylthiopropanal), 2-octenal, 2,4-nonadienal, 2,4-decadienal, 2,4-undecadienal, 2-methoxybenzaldehyde, 2,4-dodecadienal, decenal, methyl 2-furanecarboxylate, 2-ethyl-4-hydroxy-3-methyl 5(2H)-furanone, 2,6-dimethylbenzenethiol 2-nonen-1-ol, 10-undecenoic acid, undecanoic acid, isodecanoic acid and isononanoic acid.

11. The method according to claim 1, wherein the volume and fullness of tomato, asparagus, corn or celery flavor notes of vegetable or vegetable-flavored products is enhanced, improved or modified.

* * * * *